US009721576B2

(12) United States Patent
Price et al.

(10) Patent No.: US 9,721,576 B2
(45) Date of Patent: *Aug. 1, 2017

(54) COMPRESSED DOMAIN ENCODING APPARATUS AND METHODS FOR USE WITH MEDIA SIGNALS

(71) Applicant: The Nielsen Company (US), LLC, New York, NY (US)

(72) Inventors: Lois Price, Tampa, FL (US); Arun Ramaswamy, Tampa, FL (US); Scott Cooper, Tarpon Springs, FL (US)

(73) Assignee: The Nielsen Company (US), LLC, New York, NY (US)

( * ) Notice: Subject to any disclaimer, the term of this patent is extended or adjusted under 35 U.S.C. 154(b) by 519 days.

This patent is subject to a terminal disclaimer.

(21) Appl. No.: 14/188,250

(22) Filed: Feb. 24, 2014

(65) Prior Publication Data

US 2014/0172434 A1 Jun. 19, 2014

Related U.S. Application Data

(63) Continuation of application No. 11/854,982, filed on Sep. 13, 2007, now Pat. No. 8,700,411, which is a
(Continued)

(51) Int. Cl.
*G10L 19/018* (2013.01)
*G10L 19/16* (2013.01)
(Continued)

(52) U.S. Cl.
CPC .......... *G10L 19/018* (2013.01); *G10L 19/167* (2013.01); *H04H 60/37* (2013.01);
(Continued)

(58) Field of Classification Search
CPC ..... G10L 19/018; G10L 19/167; H04H 60/37; H04H 60/58; H04H 2201/90;
(Continued)

(56) References Cited

U.S. PATENT DOCUMENTS 5,867,530 A 2/1999 Jenkin
5,874,997 A 2/1999 Haigh
(Continued)

FOREIGN PATENT DOCUMENTS

AU 2011250691 12/2011
CN 101189660 7/2012
(Continued)

OTHER PUBLICATIONS

Canadian Intellectual Property Office, "Office Action", issued in connection with Canadian Patent Application No. 2,878,766, dated Feb. 29, 2016 (5 pages).
(Continued)

*Primary Examiner* — Angela A Armstrong
(74) *Attorney, Agent, or Firm* — Hanley, Flight & Zimmerman, LLC

(57) ABSTRACT

Apparatus, methods, and articles of manufacture for encoding a compressed media stream are disclosed. Example method of watermarking a digital media signal disclosed herein include copying compressed audio packets associated with an audio stream included in a transport stream of the digital media signal into respective frames of compressed audio data to be watermarked to include media identification information. Such example methods can also include determining whether a composition of the transport stream has changed during copying of the compressed audio packets into the respective frames of the compressed audio data. Such example methods can further include, if the composition of the transport stream has changed, writing the frames of the compressed audio data to an output stream corresponding to the digital media signal without applying a watermark to the frames of the compressed audio data.

15 Claims, 13 Drawing Sheets

Related U.S. Application Data continuation of application No. PCT/US2005/013507, filed on Apr. 19, 2005.

(60) Provisional application No. 60/661,527, filed on Mar. 14, 2005.

(51) Int. Cl.
  H04H 60/37     (2008.01)
  H04H 60/58     (2008.01)
  H04N 21/2389   (2011.01)
  H04N 21/81     (2011.01)
  H04N 21/8358   (2011.01)

(52) U.S. Cl.
  CPC ........ H04H 60/58 (2013.01); H04N 21/2389 (2013.01); H04N 21/23892 (2013.01); H04N 21/8106 (2013.01); H04N 21/8358 (2013.01); H04H 2201/90 (2013.01)

(58) Field of Classification Search
  CPC ......... H04N 21/2389; H04N 21/23892; H04N 21/8106; H04N 21/8358
  See application file for complete search history.

(56) References Cited

U.S. PATENT DOCUMENTS

| | | | |
|---|---|---|---|
| 6,035,177 | A | 3/2000 | Moses et al. |
| 6,373,960 | B1 | 4/2002 | Conover et al. |
| 6,577,746 | B1 | 6/2003 | Evans et al. |
| 6,804,453 | B1 | 10/2004 | Sasamoto et al. |
| 6,917,691 | B2 | 7/2005 | Evans et al. |
| 8,700,411 | B2 | 4/2014 | Price et al. |
| 2002/0034374 | A1 | 3/2002 | Barton |
| 2002/0048450 | A1 | 4/2002 | Zetts |
| 2002/0150388 | A1 | 10/2002 | Aikawa et al. |
| 2002/0173968 | A1 | 11/2002 | Parry |
| 2003/0035486 | A1* | 2/2003 | Kato .................. H04N 21/4345 375/240.26 |
| 2004/0059581 | A1 | 3/2004 | Kirovski et al. |
| 2004/0218093 | A1 | 11/2004 | Radha et al. |
| 2005/0022253 | A1 | 1/2005 | Chen et al. |
| 2005/0025332 | A1 | 2/2005 | Seroussi |
| 2005/0039064 | A1 | 2/2005 | Balakrishnan et al. |

FOREIGN PATENT DOCUMENTS

| | | |
|---|---|---|
| CN | 102685562 | 9/2012 |
| WO | 02/091361 | 11/2002 |
| WO | 03/067886 | 8/2003 |
| WO | WO 03067886 | * 8/2003 |
| WO | 2004/038538 | 5/2004 |
| WO | WO 2004038538 | * 5/2004 |

OTHER PUBLICATIONS

State Intellectual Property Office of China, "Notice of Allowance", issued in connection with Chinese Patent Application No. 201210147529.7, dated Mar. 7, 2016 (5 pages).
IP Australia, "Examiner's First Report," issued in connection with Australian Patent Application No. 2005329052, Mar. 30, 2010, 3 pages.
IP Australia, "Notice of Acceptance," issued in connection with Australian Patent Application No. 2005329052, Jul. 27, 2011, 3 pages.
IP Australia, "Examiner's Report No. 2," issued in connection with Australian Patent Application No. 2005329052, Apr. 15, 2011, 2 pages.
IP Australia, "Patent Examination Report No. 1," issued in connection with Australian Patent Application No. 2011250691, Jun. 21, 2012, 4 pages.
IP Australia, "Notice of Acceptance," issued in connection with Australian Patent Application No. 2011250691, Jul. 3, 2013, 2 pages.
Canadian Intellectual Property Office, "Office Action," issued in connection with Canadian Patent Application No. 2,600,874, Aug. 1, 2012, 3 pages.
Canadian Intellectual Property Office, "Office Action," issued in connection with Canadian Patent Application No. 2,600,874, Sep. 23, 2013, 4 pages.
State Intellectual Property Office of China, "First Office Action," issued in connection with Chinese Patent Application No. 200580049536.1, Mar. 30, 2010, 10 pages.
State Intellectual Property Office of China, "Decision to Grant," issued in connection with Chinese Patent Application No. 200580049536.1, Feb. 27, 2012, 3 pages.
State Intellectual Property Office of China, "Second Office Action," issued in connection with Chinese Patent Application No. 200580049536.1, Nov. 8, 2011, 8 pages.
State Intellectual Property Office of China, "First Office Action," issued in connection with Chinese Patent Application No. 201210147529.7, Jan. 6, 2014, 10 pages.
European Patent Office, "Decision to Refuse," issued in connection with European Patent Application No. 05736583.5, Jan. 7, 2014, 42 pages.
European Patent Office, "Exam Report," issued in connection with European Patent Application No. 05736583.5, Oct. 21, 2011, 7 pages.
European Patent Office, "Summons to Attend Oral Proceedings," issued in connection with European Patent Application No. 05736583.5, Aug. 1, 2013, 7 pages.
European Patent Office, "Supplemental European Search Report," issued in connection with European Patent Application No. 05736583.5, Feb. 3, 2011, 3 pages.
Mexican Patent Office, "Office Action," issued in connection with Mexican Patent Application No. MX/a/2007/011286, Oct. 2, 2009, 4 pages.
Taiwan Patent Office, "Preliminary Examination Report," issued in connection with Taiwan Patent Application No. 095110536, Jun. 20, 2012, 41 pages.
Taiwan Patent Office, "Office Action," issued in connection with Taiwan Patent Application No. 095110536, Jun. 18, 2013, 10 pages.
United States Patent and Trademark Office, "Non-Final Office Action," issued in connection with U.S. Appl. No. 11/854,982, Oct. 13, 2011, 11 pages.
United States Patent and Trademark Office, "Final Office Action," issued in connection with U.S. Appl. No. 11/854,982, Jul. 19, 2012, 12 pages.
United States Patent and Trademark Office, "Notice of Allowance," issued in connection with U.S. Appl. No. 11/854,982, Jul. 19, 2013, 6 pages.
United States Patent and Trademark Office, "Notice of Allowance," issued in connection with U.S. Appl. No. 11/854,982, Nov. 8, 2013, 7 pages.
Patent Cooperation Treaty, "International Search Report," issued in connection with International Patent Application No. PCT/US05/13507, Nov. 10, 2005, 4 pages.
Patent Cooperation Treaty, "Written Opinion of the International Search Authority," issued in connection with International Patent Application No. PCT/US05/13507, Nov. 10, 2005, 3 pages.
Patent Cooperation Treaty, "International Preliminary Report on Patentability," issued in connection with International Patent Application No. PCT/US05/13507, Sep. 18, 2007, 4 pages.
Watson et al., "Signaling Techniques for Broadcast Applications," Audio Engineering Society, Convention Paper 5628, May 2002, 7 pages.
Canadian Intellectual Property Office, "Notice of Allowance", issued in connection with Canadian Patent Application No. 2,600,874, dated Jul. 21, 2014 (1 page).
The State Intellectual Property Office of China, "Second Office Action", issued in connection with Chinese Patent Application No. 201210147529.7, dated Sep. 22, 2014 (15 pages).

(56) References Cited

OTHER PUBLICATIONS

The State Intellectual Property Office of China, "Third Office Action", issued in connection with Chinese Patent Application No. 201210147529.7, dated Jun. 16, 2015 (14 pages).

* cited by examiner

COMPRESSED DOMAIN ENCODING APPARATUS AND METHODS FOR USE WITH MEDIA SIGNALS

RELATED APPLICATIONS

This patent arises from a continuation of U.S. patent application Ser. No. 11/854,982 (now U.S. Pat. No. 8,700, 411), filed on Sep. 13, 2007, which is a continuation of International Patent Application No. PCT/US05/13507, filed on Apr. 19, 2005, which claims priority from and the benefit of U.S. Provisional Application No. 60/661,527, filed on Mar. 14, 2005, the entire disclosures of which are incorporated herein by reference.

FIELD OF THE DISCLOSURE

The present disclosure relates generally to media metering and, more specifically, to encoding apparatus, methods, and articles of manufacture for encoding compressed media signals.

BACKGROUND

The monitoring or metering of audience media consumption activities, such as the consumption of television and/or radio programs, often involves the encoding of broadcast media at a headend distribution station. Typically, the encoding process encodes or otherwise embeds information such as, for example, ancillary codes identifying respective broadcast sources or stations and/or particular programs, time stamp information, or any other information that may be useful for identifying and analyzing the media consumption activities and/or characteristics of audience members.

The mandate by the Federal Communications Commission that television stations migrate to Advanced Televisions Standards Committee (ATSC) digital television (DTV) service has caused many television network providers to adopt new distribution models that change the characteristics of the network feeds provided to local affiliates for distribution to consumption sites (e.g., consumer homes). For example, in some cases, media content is distributed from the network origination source through the local affiliate(s) and to the consumption sites in a pre-packaged ATSC motion picture experts group version 2 (MPEG-2) DTV format. In other words, the media content is provided in and remains in a compressed digital format throughout the distribution process and is only decompressed and decoded at its final consumption destinations (e.g., consumer homes). The distribution of media content in such a compressed format can significantly reduce transmission costs for high definition program content (e.g., reduces the costs associated with having to purchase satellite bandwidth and the like) and can reduce the capital expenditures (e.g., equipment purchases) by affiliate stations needed to convey high definition program content to consumers. Rather, in these compressed content distribution systems, the local affiliate or final distributor can insert local content (e.g., local programs, commercials, etc.) using an MPEG splicer or the like, which does not require the decompression and/or decoding of the compressed media signal(s) received from the upstream network provider.

The above-noted migration by television stations to distribution models based on the distribution of compressed media content has complicated the task of encoding media signals with metering data (e.g., ancillary codes, timestamps, etc.). For example, some known systems encode media transmitted via a local affiliate with one or more codes identifying that affiliate as a final distributor by encoding an uncompressed version of an audio portion of the media signal with the identifying codes. However, in the case where a local affiliate receives network broadcast media content in a compressed format (e.g., MPEG-2 format), the local affiliate or final distributor cannot easily access the uncompressed audio portion of the compressed media signal(s) received from the upstream network provider. More specifically, in the case of an MPEG-2 compliant media signal, the media signal is provided in a packet-based transport stream or digital data stream that may be carrying multiple programs and, thus, multiple video and/or audio streams. The audio streams are typically composed of compressed audio data (e.g., AC-3 formatted) packets that are interleaved among one another and a variety of other types of packets (e.g., video packets, program association table (PAT) packets, program and system information protocol (PSIP) packets, program map table (PMT) packets, etc.). In any event, the local affiliate or distributor cannot typically easily decompress one or more compressed audio streams, encode those decompressed streams with metering data, and recompress the encoded streams in real-time.

DETAILED DESCRIPTION

Figure 1:
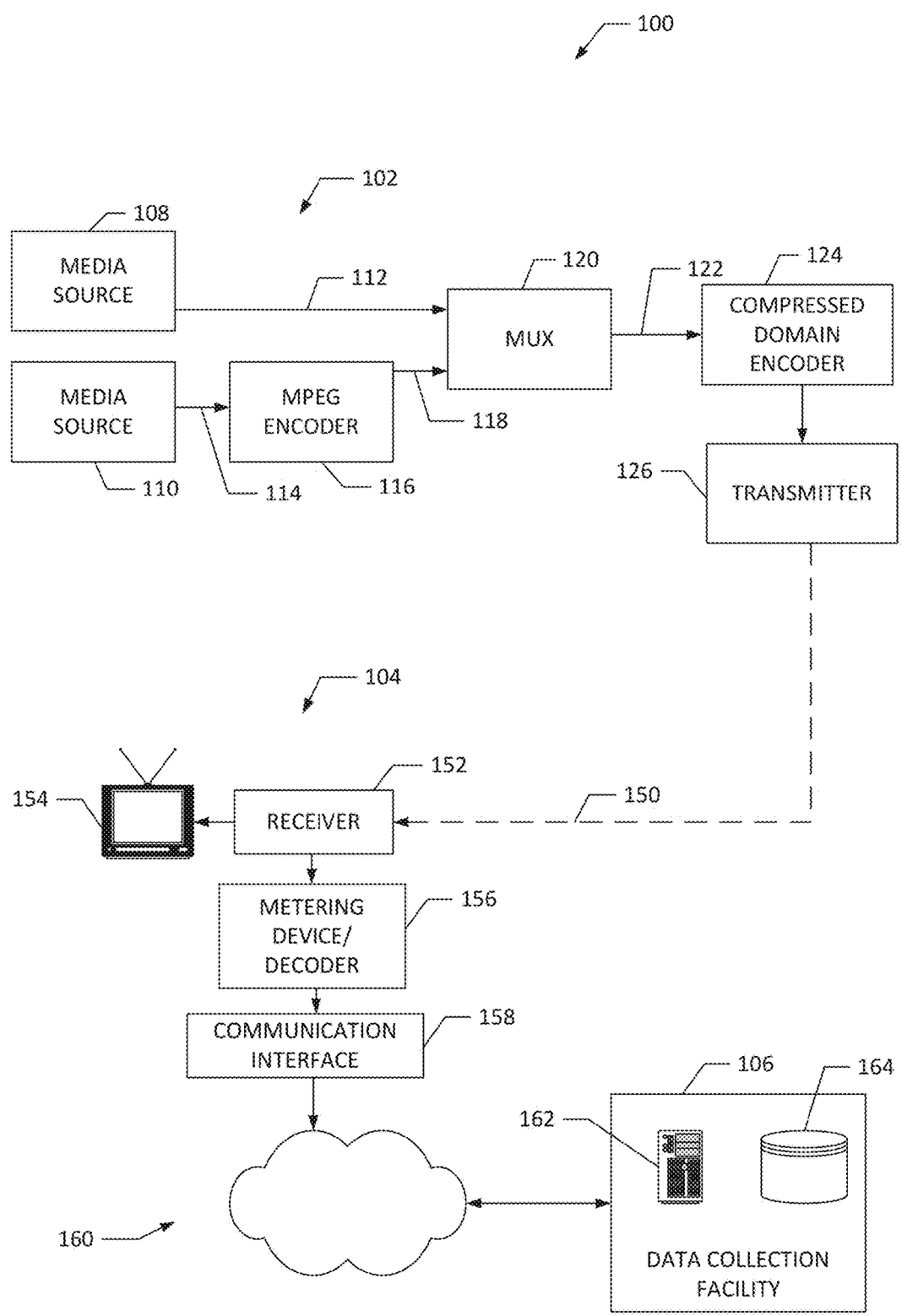
FIG. 1 depicts an example media monitoring system that uses the example encoding methods, apparatus, and articles of manufacture described herein.

Although the example systems described herein include, among other components, software executed on hardware, such systems are merely illustrative and should not be considered as limiting. For example, it is contemplated that any or all of the disclosed hardware and software components could be embodied exclusively in dedicated hardware, exclusively in software, exclusively in firmware or in some combination of hardware, firmware, and/or software.

In addition, while the following disclosure is made with respect to example television and radio systems, it should be understood that the disclosed system is readily applicable to many other media systems. Accordingly, while the following describes example systems and processes, persons of ordinary skill in the art will readily appreciate that the disclosed examples are not the only way to implement such systems.

In general, the example apparatus, methods, and articles of manufacture described herein may be used to insert, embed, or otherwise encode data such as media source identifiers, timestamps, alternative audio, or any other information in a compressed media signal such as, for example, a compressed digital transport stream. In the particular examples described herein, the compressed digital transport stream is an MPEG-2 transport stream (e.g., compliant with the ATSC standard, DVB-T standard, etc.) containing at least one AC-3 formatted audio stream. However, the apparatus, methods, and articles of manufacture described herein could also be applied to other compressed digital data formats including similar or different types of audio and/or video data.

As described in greater detail below, the example encoding apparatus, methods, and articles of manufacture enable the encoding or modification of a compressed digital transport stream including a plurality of media streams (e.g., multiple video and/or audio streams associated with one or more programs) without requiring demultiplexing, decoding, and/or decompression of the data within the digital transport stream. Further, the examples described herein encode data in the transport stream while preserving the size (e.g., byte width) and location of the original data within the transport stream. As a result, the examples described herein can be used to encode an MPEG data stream, for example, without changing the timing of the various components making up that data stream. In one example, encoding is performed by watermarking selected audio data packets. In another example, encoding is performed by inserting data in expanded auxiliary data fields of audio data frames. In yet another example, encoding is performed using a combination of watermarking and auxiliary data field data insertion. While media encoding often involves inserting or embedding code values representative of media source information, media consumption information, or the like, the apparatus, methods, and articles of manufacture described herein may also be used to perform other types of encoding or encode other types of information. For example, the apparatus, methods, and articles of manufacture described herein may be used to encode (e.g., insert) other information such as, for example, alternative audio (e.g., voice over information) in selected audio data packets.

Regardless of the type of information encoded, the example encoding apparatus, methods, and articles of manufacture described herein buffer a segment of a multi-program digital data stream or transport stream and selectively parse the buffered segment of the transport stream to extract copies of compressed audio data packets, each of which may contain data associated with one or more of plurality of component audio data streams. The locations of the copied compressed audio data packets within the original digital transport stream are stored for reference during a subsequent re-insertion or copying process. The examples described herein assemble the copied compressed audio data packets into respective frames, each of which is associated with one of the plurality of audio data streams. When a complete frame is assembled (i.e., with copies of the relevant audio data packets or slices), the frame is encoded with metering data (e.g., a source identifier, timestamp, etc.). The encoded frame is then decomposed into its component data slices, each of which is then copied using the stored location data over its corresponding location in the buffered segment of the original transport stream. A portion (e.g., a contiguous sequence of packets) of the buffered transport stream for which all audio packets to be encoded have been completely encoded is then released and transmitted or broadcast. The released portions of the buffered transport stream may vary in size from a single transport packet to multiple transport packets. Thus, the example encoding apparatus, methods, and articles of manufacture described herein may be used to encode one or more selected compressed data streams within a multi-program digital transport stream on a frame-by-frame basis and transmit portions of the encoded digital transport stream on a packet-by-packet basis.

Now turning to FIG. 1, an example media metering system 100 includes a media distribution facility 102, at least one monitored media consumption site 104, and a central data collection facility 106. In general, the media distribution facility 102 is configured to encode and broadcast or otherwise transmit one or more media signals containing video and/or audio content to the monitored consumption site 104 (e.g., a household). In turn, the monitored consumption site 104 is configured to extract the encoded data or information from media signals consumed (i.e., viewed, listened to, etc.) by one or more panelists or respondents associated with the monitored consumption site 104. The extracted encoded data may then be conveyed to the central data collection facility 106 and analyzed to determine viewing behaviors and, more generally, the characteristics, patterns, etc. of the media consumption activities associated with panelists, multiple consumption sites, etc.

The media distribution facility 102 may be located at any point or level within a multi-level media distribution system. For example, the media distribution facility 102 may be a geographically local broadcast station that is affiliated or otherwise associated with a national broadcasting company. In that case, the media distribution facility 102 receives one or more media signals from the national broadcasting company to be distributed (e.g., re-broadcast) via cable, wirelessly, or in any other manner to customers in a particular geographic service region. Additionally, the media distribution facility 102 may also generate or provide local media content or programming such as local news, commercials, community service programs, and the like, to be separately broadcast on different local channels and/or inserted into the media content and channels received from the national broadcasting company.

The media distribution facility 102 includes a plurality of media sources 108 and 110 that provide media content such as audio and/or video programs, web pages, still images, or any other consumable audio information, image information, etc. In one example, the media source 108 is provided by a media distribution entity upstream in the overall media distribution system. For example, the media source 108 may be a national broadcasting company or another similar headend media source. In the case where the media source 108 is an upstream entity, the media source 108 may provide one or more media signals 112 using one or more compressed digital data streams. Such compressed digital data streams are often generally referred to as transport streams because such compressed digital data streams are specifically configured to packetize and/or encapsulate information for reliable transport via a communication link. Accordingly, the terms "transport stream" and "data stream" may be used interchangeably throughout the description herein.

The transport stream 112 provided by the media source 108 may have any desired format or protocol. However, in the examples described herein, the media source 108 is configured to provide an MPEG compliant transport stream. MPEG is a well-known compressed digital data transmission standard that enables the transmission of a plurality of audio and/or video programs within a single data stream. As a result, the transport stream 112 provided by the media source 108 may be referred to as a multi-program transport stream, including, for example, a plurality of broadcast channels, each of which may be associated with particular media programs broadcast at particular times, conveying audio and/or video information. In some examples, the media source 108 provides an ATSC compliant MPEG-2 transport stream and, in other examples, the media source 108 provides a DVB-T MPEG-2 compliant transport stream.

The transport stream 112 provided by the media source 108 is composed of a sequence of digital data packets, some of which contain video information associated with one or more programs, channels, etc. Other data packets within the transport stream contain audio information or programs, which may be separate from or, alternatively, part of the video programs or information. In other words, the audio data packets within the transport stream may be associated with an audio portion of a television program or, alternatively, may be a radio program, which does not have a video component. Still further, other data packets within the transport stream 112 contain configuration information, information concerning the relationships among the various data packets within the transport stream 112, etc. In particular, in the case where the media source 108 provides an MPEG-2 compliant transport stream, the transport stream 112 contains PSIP tables, program association tables (PAT's), and program map tables (PMT's), all of which may be used to associate particular data packets with particular major and/or minor channels, particular data packets containing audio information (e.g., AC-3 packets) with corresponding video packets or programs, etc.

In contrast to the media source 108, the media source 110 is local to the distribution facility 102. For example, the media source 110 may be a digital versatile disk player, a hard drive containing stored audio and/or video information, a video tape playback device, etc. In some examples, the media source 110 provides an analog media signal 114, which is conveyed to an MPEG encoder 116 for conversion into a digital data stream or transport stream 118 similar or identical in format to the transport stream 112 provided by the media source 108. The transport streams 112 and 118 are provided to a multiplexer 120, which multiplexes the streams 112 and 118 to form a single multi-program transport stream 122.

A compressed domain encoder 124 receives the multi-program transport stream 122 and encodes the multi-program transport stream 122 to include source identifiers, time stamps, and/or any other information pertaining to the source(s), type, or nature of the audio and/or video content provided via the transport stream 122. As noted generally above and described in greater detail below, the compressed domain encoder 124 encodes (e.g., inserts, embeds, etc.) information in the multi-program digital transport stream 122 in real-time without decompressing or decoding the digital information contained therein. More specifically, in the examples described herein, the compressed domain encoder 124 parses the multi-program transport stream 122 to identify data packets associated with one or more compressed audio data streams, each of which may be associated with a different channel or program. In one example where the transport stream 122 is an MPEG-2 compliant data stream, the audio packets identified by the encoder 124 are AC-3 formatted audio data packets, each of which has a 4-byte header and a 184-byte payload. However, the apparatus, method, and articles of manufacture described herein may be more generally applied for use with other audio data packet formats, protocols, etc.

Once identified by the encoder 124, the audio data packets or portions thereof are copied and stored in one of a plurality of frame buffers, each of which uniquely corresponds to a particular audio data stream (e.g., a particular channel or program). In this manner, the encoder 124 uses the frame buffers to reassemble copies of one or more audio data frames associated with one or more programs or channels within the multi-program transport stream 122. Each identified audio data packet may contain one of more slices of data. For example, some of the identified audio data packets may contain audio information associated with two audio frames from a particular audio stream. The portions of information copied and saved in the frame buffers may be referred to throughout this description as slices, where any given frame of a particular audio stream is composed of multiple slices, which may have different data widths (e.g., a different number of data bytes) depending on whether the slices were part of a data packet containing information relating to multiple audio frames or part of a data packet containing information relating to only a single audio frame.

When the compressed domain encoder 124 has assembled a copy of a complete frame within any of its frame buffers, that frame copy is encoded (e.g., information is inserted, embedded, etc.) to include source identifying information (e.g., information identifying a broadcaster, a distribution level, etc.), time stamps, and/or any other desired information. As the compressed domain encoder 124 copies and saves slices of frames in respective frame buffers, the original location of each slice within the multi-program transport stream 122 is saved in association with that slice. The encoder 124 can then insert each slice of an encoded frame into its respective original position within a previously buffered portion or segment of the multi-program transport stream 122. Thus, the encoder 124 encodes compressed digital audio frames on a frame-by-frame basis and inserts the encoded information in the original multi-program transport stream 122 in a manner that preserves the size of the packets within the transport stream 122 and the timing of the data contained with the transport stream 122.

The encoder 124 monitors an encoded version of the transport stream 122 to determine whether one or more packets of the encoded transport stream should be conveyed to a transmitter 126. As described in greater detail below, the encoder 124 only releases contiguous blocks of packets (or a single packet) from the encoded transport stream in sequence and only those packets which are no longer needed for the encoding process. Thus, because the audio packets making up audio frames within the transport stream 122 are typically interleaved, the encoding process performed by the encoder 124 may complete its encoding activities for packets temporally located subsequent to packets for which encoding activities are not yet complete.

Figure 2:
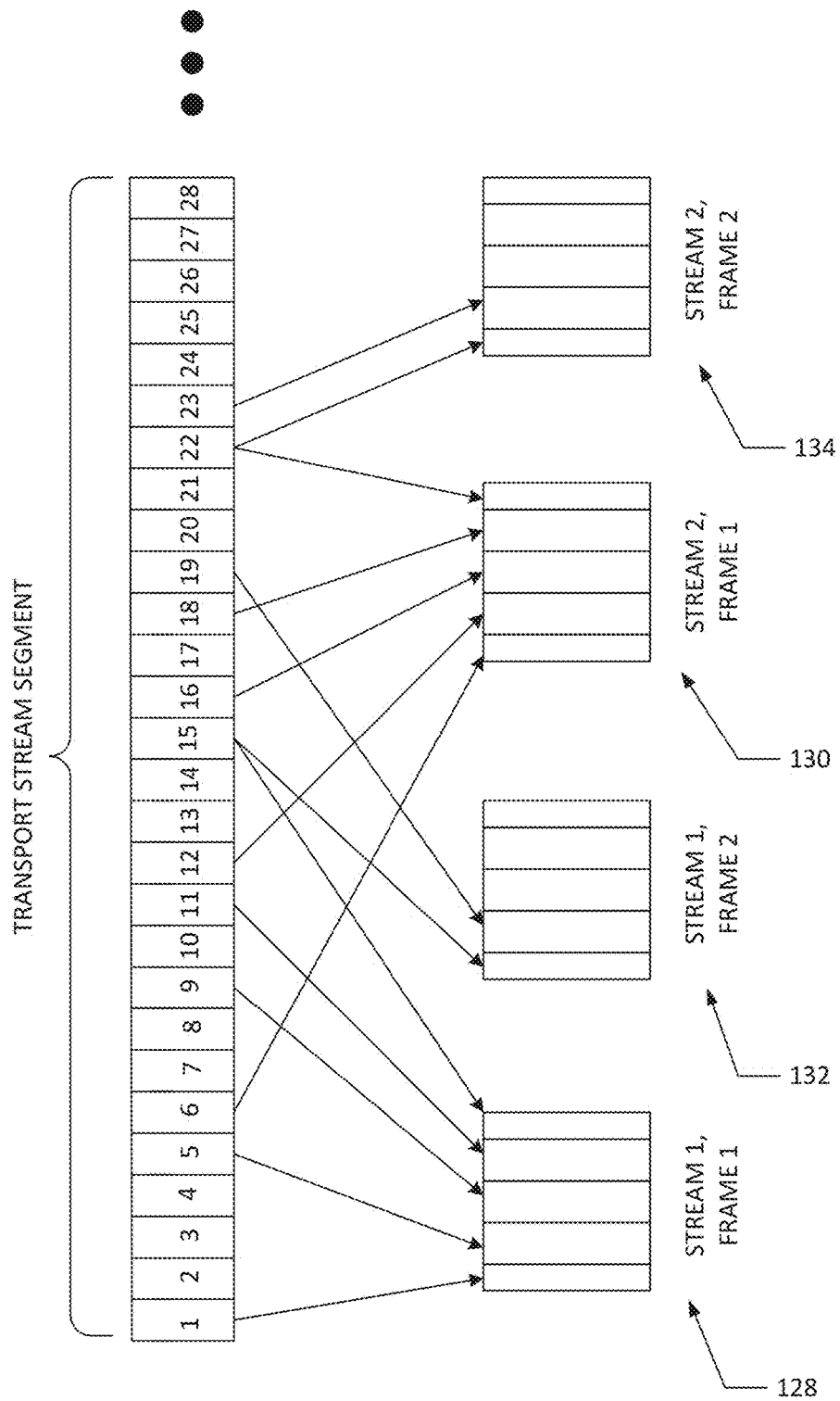
FIG. 2 is a diagram depicting an example manner in which the packets composing a frame of a media stream may be interleaved within a transport stream.

Turning to FIG. 2, an example segment of the multi-program transport stream 122 (FIG. 1) processed by the encoder 124 (FIG. 1) includes twenty-eight transport packets or data packets. In the case where the transport stream 122 is an MPEG-2 data stream, one or more audio streams may be carried within the transport stream as AC-3 packets. As depicted in the example of FIG. 2, a first frame 128 of a first audio stream is composed of slices corresponding to packets 1, 5, 9, 11, and 15. Similarly, a first frame 130 of a second audio stream is composed of slices corresponding to transport packets 6, 12, 16, 18, and 22. Thus, each of the frames 128 and 130 is composed of five slices, where the first and fifth slices of each of the frames 128 and 130 are composed of only a portion of its corresponding packet. For example, the first and fifth slices of the first frame 128 of the first audio stream correspond to portions of transport packets 1 and 11, respectively. Second frames 132 and 134 of the first and second audio streams are composed of slices corresponding to at least packets 15, 19, 22, and 23 as shown. The remaining slices of the frames 132 and 134 may correspond to transport packets occurring subsequent to the twenty-eighth packet. Thus, certain packets (e.g., those for which only a portion is used to compose a respective slice) such as, for example, packets 15 and 22, are shared by different frames of a given audio stream. Each of the frames 128, 130, 132, and 134 may be associated with a frame buffer. For example, the slices of the first and second frames 128 and 132 of the first audio stream may be stored in a first frame buffer, and the slices of the first and second frames 130 and 134 of the second audio stream may be stored in a second frame buffer. Additionally, those packets not associated with one of the frames 128, 130, 132, and 134 in FIG. 2 may be associated with audio packets of audio streams that are not to be encoded, video packets, PMT packets, PSIP packets, PAT packets, etc.

During the encoding process, the encoder 124 (FIG. 1) assembles a complete copy of the first frame 128 of the first stream before copies of the remaining audio frames 130, 132, and 134 are complete. Thus, the encoder 124 encodes the frame 128 with identifying information as desired and substitutes, copies, or overwrites the slices of the encoded frame to the original data packet locations in the transport stream from which those slices were obtained during the copying process. For example, the first slice of the encoded frame 128 is returned or copied to the location of packet 1, the second slice is copied to the location of packet 5, the third slice is copied to the location of packet 9, the fourth slice is copied to the location of packet 11, and the fifth slice is copied to the location of packet 15.

After having processed packets 1-15 of the transport stream and after encoding the first frame 128 of the first stream, the encoder 124 may determine what portion, if any, of the transport stream can be released or conveyed to the transmitter 126 (FIG. 1). In this example, although the encoder 124 has copied and encoded packets among packets 1-15, the encoder 124 has not yet encoded packet 6, for example, because a copy of the first frame 130 of the second stream is not complete until packet 22 has been processed by the encoder 124. Thus, the encoder 124 cannot yet convey packet 6 to the transmitter 126. Accordingly, in this example, the encoder 124 conveys only packets 1-5 to the transmitter 126 because those packets are no longer needed to complete the encoding process for any other frame. As can be seen from the above example, the encoder 124 is configured to encode the multi-program transport stream 122 on a frame-by-frame basis (i.e., one frame at a time) and to transmit an encoded transport stream on a packet-by-packet basis (i.e., one or more packets at a time). A more detailed discussion of the manner in which packet interleaving affects the order in which frames are encoded and the manner in which packets of an encoded transport stream are released and/or transmitted is provided in connection with FIGS. 3-12 below.

Referring again to FIG. 1 in detail, the transmitter 126 sends encoded portions or blocks (e.g., one or more packets) of the transport stream 122 via a communication link 150 to a receiver 152 (e.g., a set-top box). The communication link 150 may be a wireless link (e.g., a satellite link, a radio frequency link, etc.), a hardwired link (e.g., a cable link), or any combination thereof. The receiver 152 may provide a variety of tuning functions that enable a person at the consumption site 104 to tune to a particular channel or program. Additionally, the receiver 152 may provide a variety of user interface features such as graphical program guides, security features to prevent unauthorized viewing of particular channels and/or programs, configuration instructions and/or menus, etc.

The receiver 152 is coupled to a media presentation device 154, which may be a video monitor, a television, including speakers, or any other device capable of rendering audio and/or video information in a manner that is consumable by a person. The receiver 152 is also coupled to a metering device 156, which is configured to decode or extract the information encoded in the multi-program transport stream 122 by the encoder 124. Thus, the information extracted by the metering device 156 can include source identifiers (SID's), time stamps inserted by the encoder 124, or any other information embedded or otherwise inserted in the transport stream 122 by the encoder 124. Additionally, the metering device 156 may also associate locally generated information such as, for example, identifying information (e.g., names, demographic information, etc.) associated with one or more persons consuming media presented via the media presentation device 154. Further, the metering device 156 may also include locally generated time information (e.g., time stamps) to be associated with SID's or other information associated with programs, channels, etc. consumed at the consumption site 104.

The metering device 156 is configured to periodically or substantially continuously convey the media consumption information it extracts or collects to the data collection facility 106 via a communication interface 158 and communication link(s) 160. The communication interface 158 may be a modem or any other suitable device. The communication link(s) 160 may include any desired combination of hardwired and wireless links and/or networks including, for example, telephone networks, cable networks, the Internet, etc.

The data collection facility 106 includes a processing system 162 and a database 164 that is coupled to the processing system 162. The processing system 162 is configured to analyze information sent to it by the consumption site 104 together with information sent by one or more other consumption sites (not shown). For example, the processing system 162 may be configured to perform statistical analyses to facilitate the assessment of media consumption behaviors of particular groups of consumers (e.g., demographic groups), particular geographic regions, consumption trends, patterns, etc., or any other desired information associated with metering broadcast media.

Figure 3:
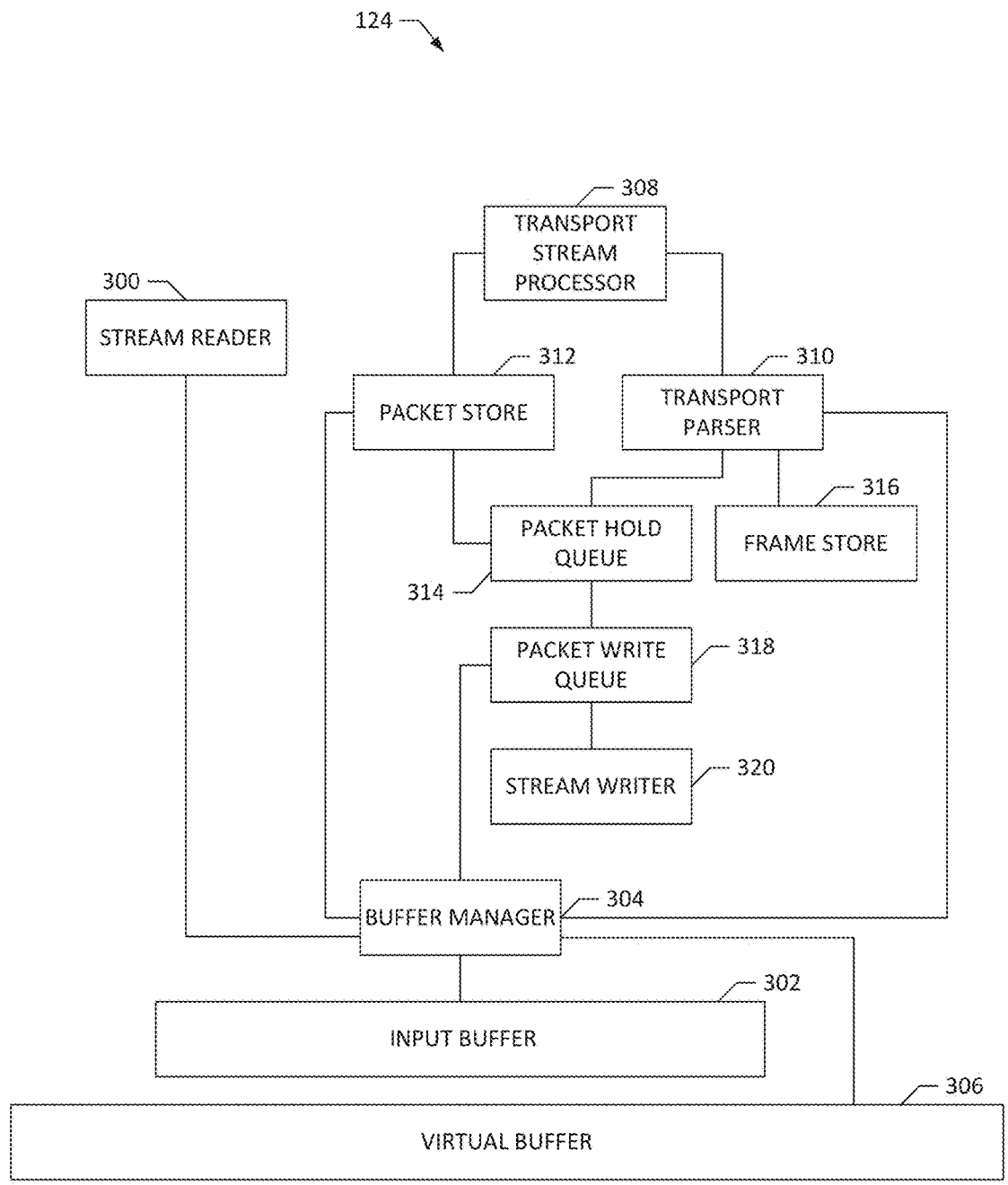
FIG. 3 is a detailed block diagram of an example implementation of the encoder shown in FIG. 1.

FIG. 3 is a detailed example functional block diagram of the compressed domain encoder 124 of FIG. 1. As noted generally above, the various functional blocks of the example encoder 124 of FIG. 3 cooperate or interoperate to encode one or more audio streams transmitted within a compressed digital transport stream in real-time without having to decompress or decode the transport stream and without changing the size and/or timing of the data contained with the transport stream. Further, as noted above, the blocks of the example encoder of FIG. 3 encode the one or more audio streams on a frame-by-frame basis and convey or transmit encoded portions or blocks of the compressed digital transport stream on a packet-by-packet basis.

Turning in detail to FIG. 3, a stream reader 300 receives the multi-program transport stream 122 (FIG. 1) and writes or stores blocks containing one or more transport packets to an input buffer 302 via a buffer manager 304. The process of obtaining and writing transport stream packets to the input buffer 302 is carried out by the stream reader 300 asynchronously with respect to the processes performed by the remaining blocks and/or processes of the example encoder 124.

The input buffer 302 is implemented as a circular buffer, which may be defined to have a predetermined size (e.g., width in data bytes) and to exist in a particular region within a memory device, within multiple memory devices, within a dedicated hardware device, etc. Thus, if the input buffer 302 is sized to hold N packets from the transport stream 122 (FIG. 1), packets 1 though packet N are written sequentially to the input buffer 302 so that packet 1 is in the first buffer location and packet N is in the last buffer location. Then, when the stream reader 300 receives and writes packets N+1, N+2, N+3, etc. to the buffer 302, the buffer manager 304 overwrites the first buffer location (in which packet 1 is currently stored) with the contents of packet N+1, the second buffer location (in which packet 2 is currently stored) with the contents of packet N+2, and so on. The length or size (e.g., number of bytes) of the input buffer 302 is selected so that packet data is overwritten well after the packet data to be overwritten is no longer needed to perform the encoding processes described herein. Thus, the size of the input buffer 302 is determined, at least in part, by the manner in which frame data is interleaved within the transport stream 122 and the processing delays associated with the various processes performed by the functional blocks of the example encoder 124 of FIG. 3.

To facilitate the coordination or synchronization (e.g., serialization of) the operations of the stream reader 300 with the operations of the other functional blocks of the encoder 124, the buffer manager 304 maintains a virtual buffer 306. As will become clearer in connection with the various processes or operations of the encoder 124 described below, the virtual buffer 306 facilitates the ability of multiple asynchronous processes to access portions of the data stored in the input buffer 302 which, as noted above, is implemented as a circular buffer (i.e., a physical buffer).

Unlike the input buffer 302, the virtual buffer 306 is not associated with a particular block or portion of a memory. Instead, the virtual buffer 306 is implemented using three counters. Specifically, a first counter counts the cumulative total number of bytes read by the stream reader 300 and written by the buffer manager 304 to the input buffer 302. A second counter counts the cumulative total number of bytes that the buffer manager 304 has passed to the transport parsing function described in detail below. Finally, a third counter counts the cumulative total number of bytes that the buffer manager 304 has released to be written to the encoded transport stream.

In addition to facilitating the coordination or synchronization of the processes accessing the input buffer 302 via the buffer manager 304, certain relationships between the input buffer 302 and the virtual buffer 306 may be analyzed to identify error conditions and/or assess the relative performance characteristics of the various processes performed by the functional blocks of the example encoder 124 of FIG. 3. For example, the difference between the first and third counters represents a total stream delay due to processing, caching, etc. Thus, when the difference between the first and third counters exceeds the size of the input buffer 302, a buffer overflow condition has occurred. In other words, the total stream delay exceeds the size of the portion of the transport stream that can be buffered in the input buffer 302. Such a condition may be a serious error because it indicates that the stream reader 300 is storing transport packets in the input buffer 302 a rate that exceeds the rate at which packets are being processed by the encoding processes. In another example, if the difference between the first and third counters equals zero (i.e., the counter values are equal), then a buffer underflow condition has occurred. Such a condition is not an error because it indicates that the encoding processes are running at least as fast as the stream reader 300. In still another example, the difference between the second and third counters represents a stream delay associated with the caching of packets to perform the encoding processes described herein.

While the virtual buffer 306 is not truly boundless, it can be made substantially boundless for practical purposes. For instance, if the three counters used for the virtual buffer 306 are implemented using 64-bit counters, it would take approximately 234,000 years to fill the virtual buffer 306 (i.e., roll-over one or more of the counters making up the virtual buffer 306) at a rate of 2,500,000 bytes per second.

The segment of the multi-program transport stream 122 (FIG. 1) stored in the input buffer 302 is parsed and encoded via the cooperative operation of a transport stream processor 308, a transport parser 310, a packet store 312, a packet hold queue 314, and a frame store 316. The parsing and encoding operations performed using these blocks are asynchronous with respect to the operations of the stream reader 300 and, thus, rely on the synchronization or coordination capabilities of the buffer manager 304 to control the manner in which the parsing and encoding operations interact with the input buffer 302 and the packet data stored therein.

In general, the transport stream processor 308 requests packet information from the packet store 312 one packet at a time. In response to a request for packet information from the transport stream processor 308, the packet store 312 provides an encapsulated data structure (e.g., an object-oriented data structure) containing information relating to a next transport packet in the input buffer 302 to be parsed and processed (e.g., potentially encoded if the packet is a compressed audio packet associated with an audio stream to be encoded). In the examples described herein, the packet store 312 maintains an array of packet objects (i.e., object-oriented data structures), each of which can be used to temporarily hold information relating to a single transport packet currently present in the input buffer 302. More specifically, when the transport stream processor 308 requests packet information from the packet store 312, the packet store 312 selects an available packet object (i.e., a packet object from its array of packet objects available for use) to hold information relating to a transport packet that has not yet been parsed, processed, encoded, etc. The packet store 312 then communicates with the buffer manager 304 to obtain pointer information identifying the location of a next transport packet in the input buffer 302. The packet store 312 populates the selected packet object with the pointer information so that the packet object becomes representative of the next transport packet in the input buffer 302. The use of packet objects and the pointers contained therein significantly reduces the amount of data (e.g., transport packet contents) that has to be copied or transferred from the input buffer 302 to another memory location within the encoder 124. As described in greater detail below, many of the transport packet parsing, encoding, and other processing operations performed by the transport parser 310, the frame store 316, and the packet hold queue 314 can be performed using the packet objects provided by the packet store 312, thereby enabling processing of the transport packets in the input buffer 302 without having to physically copy or transfer the transport packet contents from the input buffer 302 to other memory locations in the encoder 124. Such a reduction in memory copy or transfer operations significantly increases the rate at which the encoder 124 can process transport stream packets and improves the real-time processing capabilities of the encoder 124.

Packet objects allocated by the packet store 312 to hold transport packet information can be reused or recycled after the packet objects have been fully processed by the encoder 124. Thus, the packet objects in the array of packet objects maintained by the packet store 312 can be used many times to temporarily hold information relating to many transport packets.

Each packet object received from the packet store 312 by the transport stream processor 308 is passed to the transport parser 310 for parsing and/or other processing. The transport parser 310 uses the information (e.g., the pointer information) in each packet object received from the transport stream processor 308 to identify the type of information stored in the transport packet associated with that packet object. More specifically, the transport processor 310 uses the pointer information in the packet object to read transport packet header information which, in turn, is used to identify the type of information stored in the transport packet. In the examples described herein, the transport parser 310 looks for compressed audio packets (e.g., AC-3 packets) associated with one or more particular audio streams selected for encoding.

In addition to parsing the header information, the transport parser 310 further parses each compressed audio packet that it has identified for encoding. In particular, the transport parser 310 parses selected compressed audio packets to identify slice boundaries (i.e., the boundaries between audio frames within transport packets). Using the identified slice boundaries, the transport parser 310 builds copies of audio frames associated with audio streams to be encoded. The copies of audio frames are built and maintained by the transport parser 310 using frame buffer objects provided by the frame store 316. More specifically, the transport parser 310 establishes one frame buffer for each audio stream to be encoded and uses packet objects associated with the slices of the audio frames to be encoded to push the contents (e.g., the audio payload data) of the transport packets corresponding to those packet objects onto a corresponding frame buffer.

The transport parser 310 may also process other types of transport packets (i.e., transport packets containing information other than compressed audio to be encoded) such as, for example, packets containing PAT information, PMT information, and PSIP information. In particular, PAT, PMT, and PSIP information may be used to associate SID's with particular programs, channels, and/or audio PID's to identify audio streams to be encoded, etc.

All packet objects processed by the transport parser 310, whether the packet objects are representative of compressed audio packets selected for encoding or other types of packets, are pushed to the packet hold queue 314. However, packet objects that are associated with or representative of transport packets containing compressed audio data to be encoded (i.e., those packets having contents that have been pushed onto one of the queues in the packet hold queue 314) are marked or otherwise identified as "to be edited," which indicates that those packets are to be encoded, whereas all other packet objects are marked or otherwise identified as "pass through," which indicates that those packets are not to be encoded. Thus, the packet hold queue 314 holds a sequence of packet objects that corresponds to at least a portion of the sequence of transport packets stored in the input buffer 302. However, as described in greater detail below, for all packet objects except those packet objects associated with compressed audio frames to be encoded, the packet objects are released for reuse by the packet store 312. Although the packet objects are released for reuse by the packet store 312, the packet hold queue 314 holds the packets referred to by these released objects by storing the identity of the last byte of the virtual buffer 306 occupied by each of transport packets corresponding to the released packet objects.

In addition to receiving all packet objects (i.e., whether they are identified as "pass-through" objects or "to be edited") the packet hold queue 314 also maintains one queue for each compressed audio stream to be encoded. In particular, each queue includes packet objects associated with a particular audio stream and may include a number of packet objects that corresponds to two frames of compressed audio data. Thus, each packet object corresponds to a single slice of a compressed audio frame or, in the case of transition packet, a slice of each of two consecutive audio frames. Further, as noted above and in contrast to the packet objects associated with all other types of packets, the packet objects corresponding to audio frames to be encoded are not yet released for reuse by the packet store 312.

The transport parser 310 monitors the queues in the packet hold queue 314 to identify when complete copies of frames to be encoded are available in the frame buffer(s). When the transport parser 310 identifies a complete frame, the transport parser 310 encodes (e.g., inserts or embeds watermark data or other identifying information in) the completed frame. In this manner, the transport parser 310 encodes one or more audio streams on a frame-by-frame basis. The transport parser 310 in cooperation with the buffer manager 304 copies each slice of the encoded frame to its respective original position in the transport packet stream stored in the input buffer 302. In other words, the transport parser 310 overwrites encoded slice data in locations in the input buffer 302 corresponding to the original slice data.

After the transport parser 310 has copied or overwritten encoded frame data from a frame buffer to the input buffer 302 (i.e., has used the slices of the encoded frame data to overwrite the corresponding slices in the original transport stream stored in the input buffer 302), the transport parser 310 instructs the packet hold queue 314 to remove the packet objects corresponding to that frame from the queue assigned to hold packet objects associated with the audio stream from which that frame was originally copied.

After the packet hold queue 314 receives an instruction from the transport parser 310 to remove packet objects, the packet hold queue 314 determines the location of the oldest packet currently being held by the packet hold queue 314 in any of its packet object queues. In other words, the packet hold queue 314 reviews the sequence of packets held by the packet hold queue 314 (the sequence of packets corresponds to at least a portion or segment of the sequence of packets in the input buffer 302) to determine what portion of the packets held can be released and transmitted. Specifically, the packet hold queue 314 effectively reviews the held packets in order on a packet-by-packet basis to determine what portion, if any, of the held packet sequence can be released and transmitted. For example, the packet hold queue 314 may determine that only the oldest packet being held can be released or, alternatively, may determine, for example, that the oldest fifteen packets can be released and transmitted. In any case, once the packet hold queue 314 has identified packets to be released and transmitted, the packet hold queue 314 instructs a packet write queue 318 to provide those packets to a stream writer 320, which conveys the packet information to the transmitter 126 (FIG. 1). In general, the packet write queue 318 cooperates with the buffer manager 304 to identify for the stream writer 320 the physical locations of the packets in the input buffer 302 that are to be conveyed for transmission.

The operations of the various blocks described in connection with FIG. 3 may be implemented using machine or processor executable computer code or software instructions using any desired programming languages and/or techniques. The example implementations described herein employ object-oriented programming techniques and use, for example, encapsulated data structures (i.e., objects) that facilitate the implementation of the various blocks described in connection with FIG. 3. However, any other programming techniques could be used instead of or in addition to those specifically described herein. Additionally or alternatively, the various blocks described in connection with FIG. 3 may be implemented using any desired type or combination of hardware (e.g., ASIC's, digital logic, analog circuitry, etc.). Further, as described in greater detail below, many of the blocks depicted in the example block diagram of FIG. 3 generate and/or pass pointers to packet data within the input buffer 302 rather than passing the actual data or transport packet content. For example, the buffer manager 304 passes such pointers to the packet store 312 for each transport packet to be processed or parsed by the transport parser 310. However, only the packets to be encoded (e.g., only AC-3 packets corresponding to audio streams to be encoded) require the copying of actual transport packet content to the frame queues managed by the transport parser 310 as well as the subsequent copying of encoded frame data back into the segment of the transport stream stored in the input buffer 302. All other transport packet content or data such as video packet data may remain in place in the input buffer 302. Thus, because the compressed audio packets to be encoded typically compose a relatively small portion of the overall transport stream, the effective rate at which the transport stream can be processed (e.g., in real-time) can be significantly increased.

In addition to compressed audio packets to be encoded, the data associated with certain other packets such as, for example, packets containing PMT data, PSIP data, PAT data, etc. may be processed by state machines in known manners. As described below, such additional data may be used to identify which of the audio streams are to be encoded, to associate SID's with particular channels, etc. However, such additional data typically composes only a small portion of the data contained within a transport stream (e.g., in comparison to the amount of video data in the transport stream) and, thus, copying of such additional data does not significantly reduce the rate at which a transport stream can be encoded using the example apparatus, methods, and articles of manufacture described herein.

Figure 4:
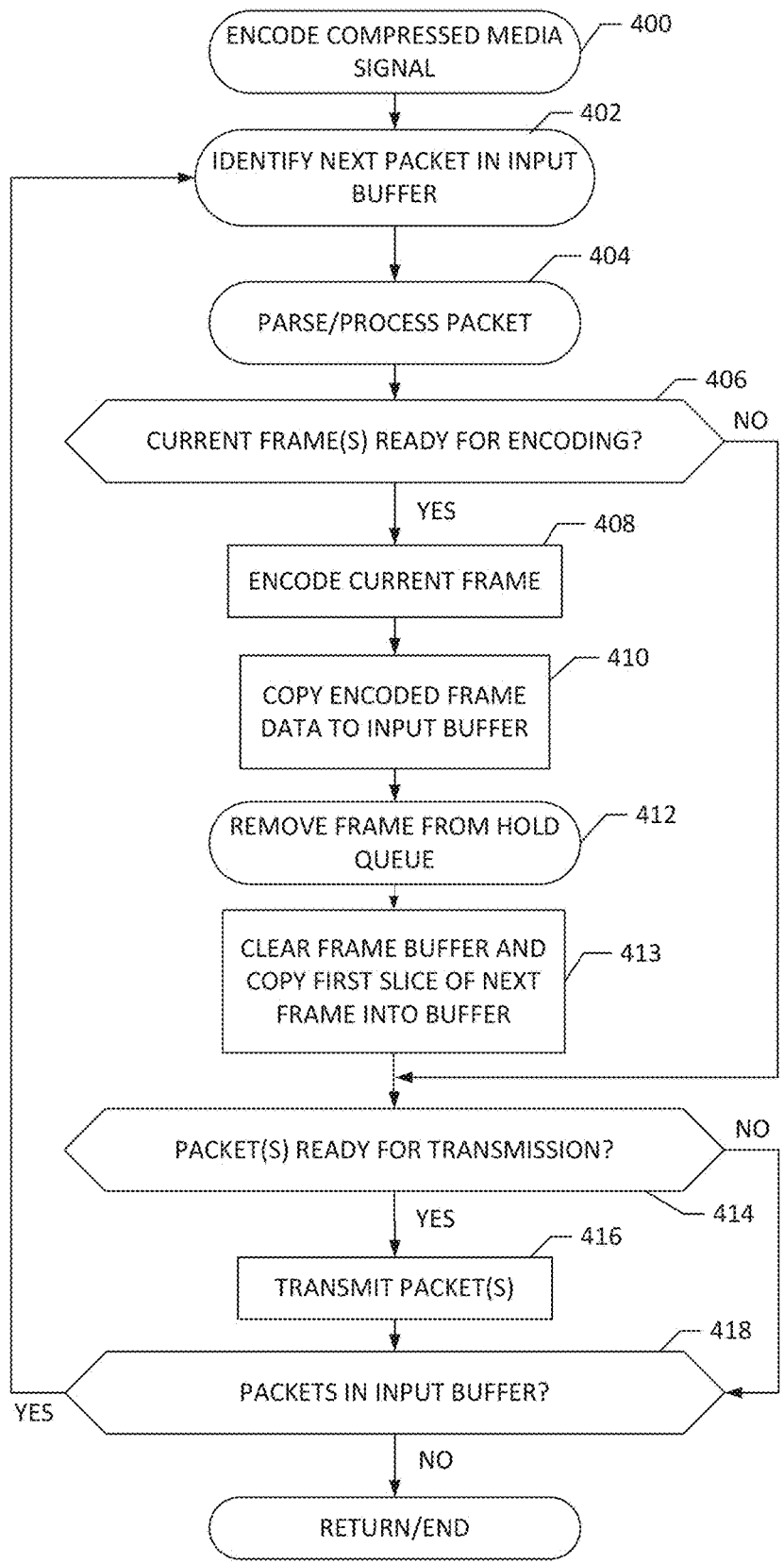
FIG. 4 is a flow diagram depicting an example encoding process that may be performed by the example encoder shown in FIG. 3.

FIG. 4 depicts an example encoding process 400 that may be performed by the example encoder 124 shown in FIG. 3. The various blocks or operations shown in FIG. 4 may be implemented as machine readable and executable instructions or code, which may be stored on a memory and executed by, for example, a processor. Alternatively, some or all of the blocks shown in FIG. 4 may instead be implemented using dedicated hardware devices (e.g., ASIC's). In the case where one or more blocks are representative of machine readable and executable instructions or code, those blocks may be implemented using a processor system such as the example processor system 1302 shown in FIG. 13. Alternatively or additionally, one or more of the blocks shown in FIG. 4 may be implemented using one or more blocks of the example encoding apparatus 124 depicted in FIG. 3.

In general, the example encoding process 400 of FIG. 4 sequentially processes and parses the packets of a compressed digital transport stream such as, for example, an MPEG-2 compliant transport stream or data stream. As will be described in greater detail below, the contents of selected packets (e.g., compressed audio packets associated with one or more selected audio streams) are collected into respective frames. As each collected frame is completed, it is encoded with identifying information (e.g., SID's, timestamps, etc.) and/or any other information. Any desired encoding process may be used to encode the collected frames of compressed audio data. However, in the examples described herein, a watermarking encoding technique and/or a technique that inserts data into auxiliary data fields may be particularly useful when used with the encoding apparatus, methods, and articles of manufacture described herein. Regardless of the frame encoding technique used, the slices composing the encoded frames are inserted (e.g., overwritten) to their original positions within the transport stream in a manner that preserves the timing and packet sizes (i.e., byte lengths) of the original transport stream. A portion of the transport stream for which encoding operations are complete (e.g., a single packet or a plurality of sequential packets) is released and transmitted to, for example, another media distribution facility and/or one or more consumption sites (e.g., households, business establishments, etc.). Thus, the example encoding process 400 of FIG. 4 may be used to encode one or more compressed audio streams on a frame-by-frame basis and may release and transmit portions of the encoded transport stream on a packet-by-packet basis. Such a frame-by-frame encoding and packet-by-packet release and transmission technique enables the efficient real-time processing and encoding of a compressed digital data stream or transport stream containing multiple media streams (e.g., multiple audio and/or video data streams), particularly where the transport packets composing those media streams to be encoded are temporally interleaved within the transport stream.

Turning in detail to FIG. 4, the example encoding process 400 identifies a next packet within the input buffer 302 (FIG. 3) to be processed, parsed, etc. (block 402). In general, the identification operation (block 402) is performed by identifying the next packet in sequence within the input buffer 302 to be processed (e.g., via the buffer manager 304 of FIG. 3), assigning a packet object (e.g., an object-oriented data structure representative of a packet) to the next packet (e.g., via the packet store 312), and storing pointer information corresponding to the location of the next packet in the input buffer 302 in the packet object (e.g., via the packet store 312). The resulting packet object including the pointer information is then passed to a packet parsing/processing operation (e.g., via the transport stream processor 308 to the transport parser 310).

In the case of the example encoder 124 of FIG. 3, the identification process of block 402 is carried out in the following manner. The transport stream processor 308 requests a next transport packet for parsing and/or processing from the packet store 312. The packet store 312 assigns an available packet object for use in representing the next transport packet and requests pointer information from the buffer manager 304. In turn, the buffer manager 304 obtains pointer information relating to the next packet to be processed, parsed, etc. and provides that pointer information to the packet store 312. The packet store 312 stores the pointer information in the assigned packet object and provides the packet object to the transport stream processor 308. The transport stream processor 308 then provides the packet object (including the pointer information relating to the next transport packet) to the transport parser 310. Of course, alternatively, one or more of the activities associated with the identification process of block 402 may be performed using machine readable instructions executed by a processor system such as the system 1302 of FIG. 13. A more detailed example of the identification operation of block 402 is described below in connection with FIG. 5.

After the next packet in the input buffer 302 (FIG. 3) is identified at block 402, the identified packet is parsed and/or processed (block 404). In general, the operations performed at block 404 use the packet information received from block 402 to identify the type of the packet to be parsed/processed and parse and/or process the packet information based on the packet type. As described in greater detail in connection with FIG. 7 below, only compressed audio packets (e.g., AC-3 packets in the case where an MPEG compliant transport stream is being parsed/processed) from selected audio streams are selected for encoding. The packets to be encoded are copied and decomposed into their component slices, each of which is stored in a frame buffer corresponding to the audio stream with which the slices are associated. As noted above, there is one frame buffer for each audio stream to be encoded and, thus, each frame buffer holds only slices belonging to the same compressed audio stream.

The example encoding process 400 then determines (e.g., via the transport parser 310) whether any current frame within any of the frame buffers is ready for encoding (i.e., the frame is complete) (block 406). A frame is ready for encoding when all slices making up that frame have been stored in its corresponding frame buffer. If a current frame is ready for encoding at block 406, the frame is encoded (e.g., via the transport parser 310) (block 408) using, for example, a watermarking process such as that disclosed in International Patent Application No. PCT/US04/18953, the entire disclosure of which is incorporated herein by reference. Alternatively or additionally, the encoding (block 408) may be performed using a data insertion technique that enlarges auxiliary data fields and inserts information in the enlarged auxiliary data fields. An example of such a data insertion technique is disclosed in International Patent Application No. PCT/US03/28037, the entire disclosure of which is incorporated herein by reference. However, any other desired encoding method suitable for encoding compressed digital data could be used instead of or in addition to those specifically mentioned above.

After encoding the current frame (block 408), the example encoding process 400 copies the encoded frame data to the input buffer 302 (FIG. 3) (block 410). More specifically, each slice of the encoded frame is copied to (i.e., overwrites) the location in the original transport stream from which the slice was copied during the parsing and/or other processing at block 404 (e.g., via the transport parser 310 and the buffer manager 304). As mentioned above, the slices composing any given frame may be interleaved among one or more other similar or different types of transport packets (e.g., video, compressed audio associated with other audio streams, PMT packets, PSIP packets, PAT packets, etc.). Further, as noted above, a transport packet to be encoded may include slices from different frames of an audio stream. For example, the last slice of a first frame of an audio stream and first slice of a next or second frame may both be associated with the same original transport packet. In that case, the transport packet to be encoded may be referred to as a transition packet and, as described in greater detail below, such a transition packet is released for transmission only when all the frames contributing slices to that packet have been encoded. Accordingly, in the above example, both the first and second frame would have to be encoded before releasing the transition packet for transmission.

After the slices associated with an encoded frame have been copied to (i.e., have overwritten) the original transport stream in the input buffer 302 (FIG. 3), the example encoding process 400 (e.g., via the transport parser 310 and the packet hold queue 314) removes the encoded frame information from a hold queue (block 412). For example, in the case where the example encoder 124 (FIG. 3) uses packet objects within the hold queue (314), the packet objects associated with objects making up the frame to be removed are released for reuse to the packet store 312. However, if a frame to be released ends with a transition packet, the packet object associated with that transition packet is not released. In this manner, the example encoder 124 ensures that the transition packet is fully encoded (i.e., that all slices composing the transition packet are encoded) prior to releasing the transition packet. A more detailed description of an example implementation of the frame removal process (block 412) is provided in connection with FIG. 10 below.

After the packet objects are removed from the hold queue at block 412, the frame buffer (holding the content associated with the removed packet objects) is cleared and the first slice of the next frame is copied into the frame buffer (block 413).

If there are no current frames ready for encoding at block 406 or after performing the operations at block 413, the example encoding process 400 determines whether there are one or more packets ready for transmission (e.g., ready for broadcast) (block 414). For example, in the case of the example encoding apparatus 124 of FIG. 3, the packet hold queue 314 and the packet write queue 318 cooperate to identify the oldest held byte (which is necessarily part of the oldest held packet) in the input buffer 302. The contiguous block or sequence of transport packets preceding the oldest held byte are fully encoded packets and, thus, may be transmitted without affecting the encoding of any remaining bytes or packets. Thus, the contiguous block or sequence of transport packets preceding the oldest held byte can then be safely transmitted (block 416) (e.g., via the stream writer 320 of FIG. 3).

As noted generally above, none, one, or multiple packets may be ready for transmission at any given time. However, if no packets are ready at block 414 or if ready packets have already been transmitted (block 416), then the example encoding process 400 determines if there are more packets to process in the input buffer 302 (block 418). If there are more packets to process, control is returned to block 402. On the other hand, if there are no more packets to process, then the encoding process 400 may be stopped and/or control may be returned to another process.

Figure 5:
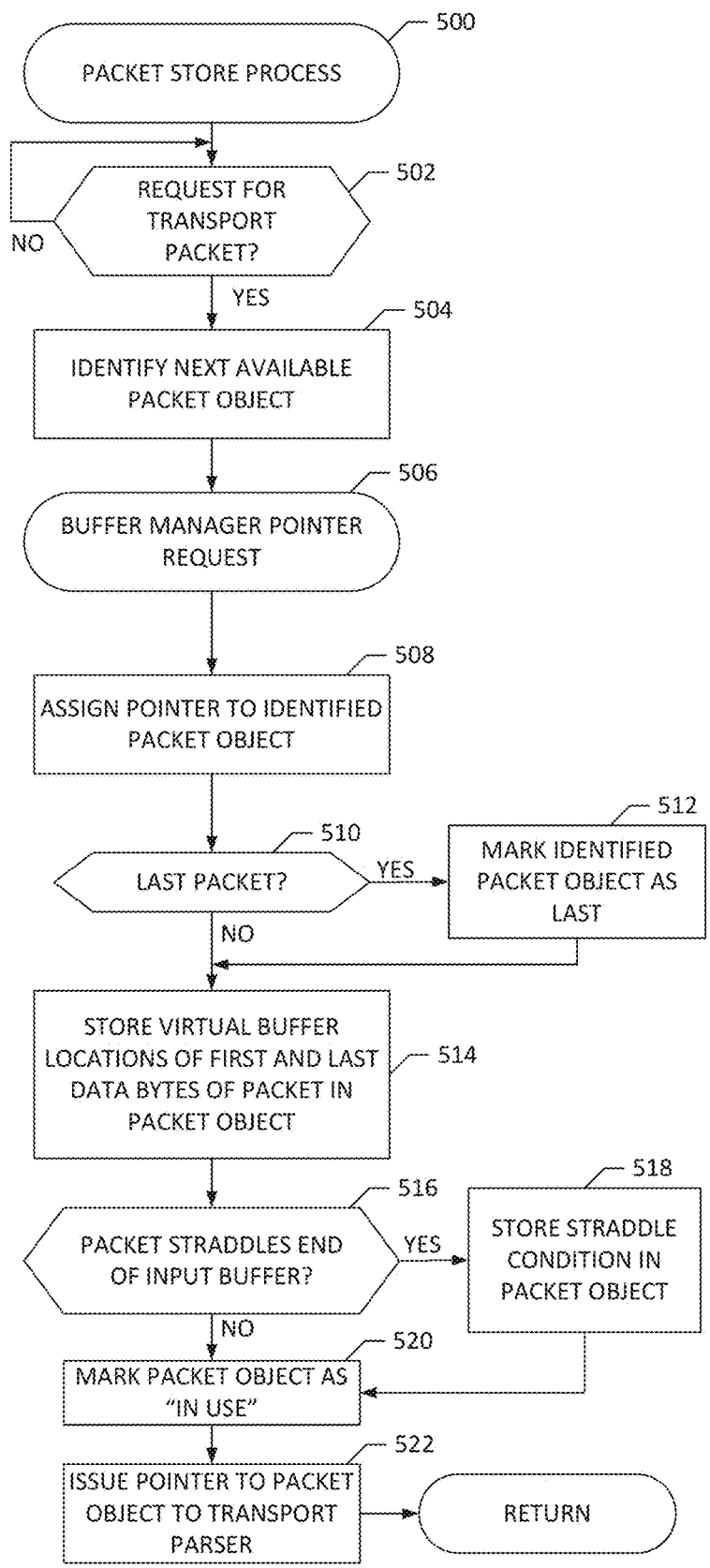
FIG. 5 is detailed flow diagram depicting an example process that may be performed by the packet store of FIG. 3 to identify a next transport stream packet for processing.

FIG. 5 is flowchart of an example process 500 that may be carried out by the packet store 312 (FIG. 3) and/or the processor system 1302 (FIG. 13) to identify the next packet for parsing and/or processing in the input buffer 302 (block 402 of FIG. 4). The example process 500 initially waits for a transport packet request (block 502). For example, as described in connection with the example encoder 124 of FIG. 3, the transport stream processor 308 requests a next packet from the packet store 312 and, when the packet store 312 receives this request, the packet store 312 identifies the next available packet object (block 504).

After identifying the next available packet object (block 504), the example process 500 requests a pointer from the buffer manager 304 (block 506). As described in greater detail in connection with FIG. 6 below, in the case of the example encoding apparatus 124 of FIG. 3, the buffer manager pointer request process 506 includes the buffer manager 304 receiving a pointer request from the packet store 312 and issuing a pointer to the next packet header in the input buffer 302. The buffer manager pointer request process 506 returns the pointer to the next packet header and the packet store process 500 assigns the returned pointer to the packet object identified (block 508). The buffer manager 304 uses the virtual buffer 306 to ensure that pointer delivered to the packet object, in fact, is a valid transport packet ready for parsing.

The example process 500 then determines whether the packet object including the returned pointer information corresponds to a last packet (block 510). If the packet object is the last packet at block 510, data indicating that the packet object is representative of a last packet is stored in the packet object (i.e., the packet object is marked as being representative of a last packet) (block 512). If the packet object is not representative of a last packet at block 510 or if the packet object has been marked as being representative of a last packet at block 512, then the example process 500 stores in the packet object the virtual buffer locations of the first and last data bytes of the packet represented by the packet object (block 514).

After storing the virtual buffer locations at block 514, the example process 500 determines if the packet represented by the packet object straddles the end of the input buffer 302 (block 516). If the packet straddles the end of the input buffer 302, data indicative of a straddle condition are stored in the packet object (block 518). If the packet does not straddle the end of the input buffer 302 at block 516 or after the data indicative of a straddle condition are stored in the packet object at a block 518, the packet object is marked "in use" (block 520). After the packet object is marked "in use" at block 520, the process 500 issues a pointer to the packet object to the transport parser 310 (block 522) and control is returned to block 404 of FIG. 4.

Figure 6:
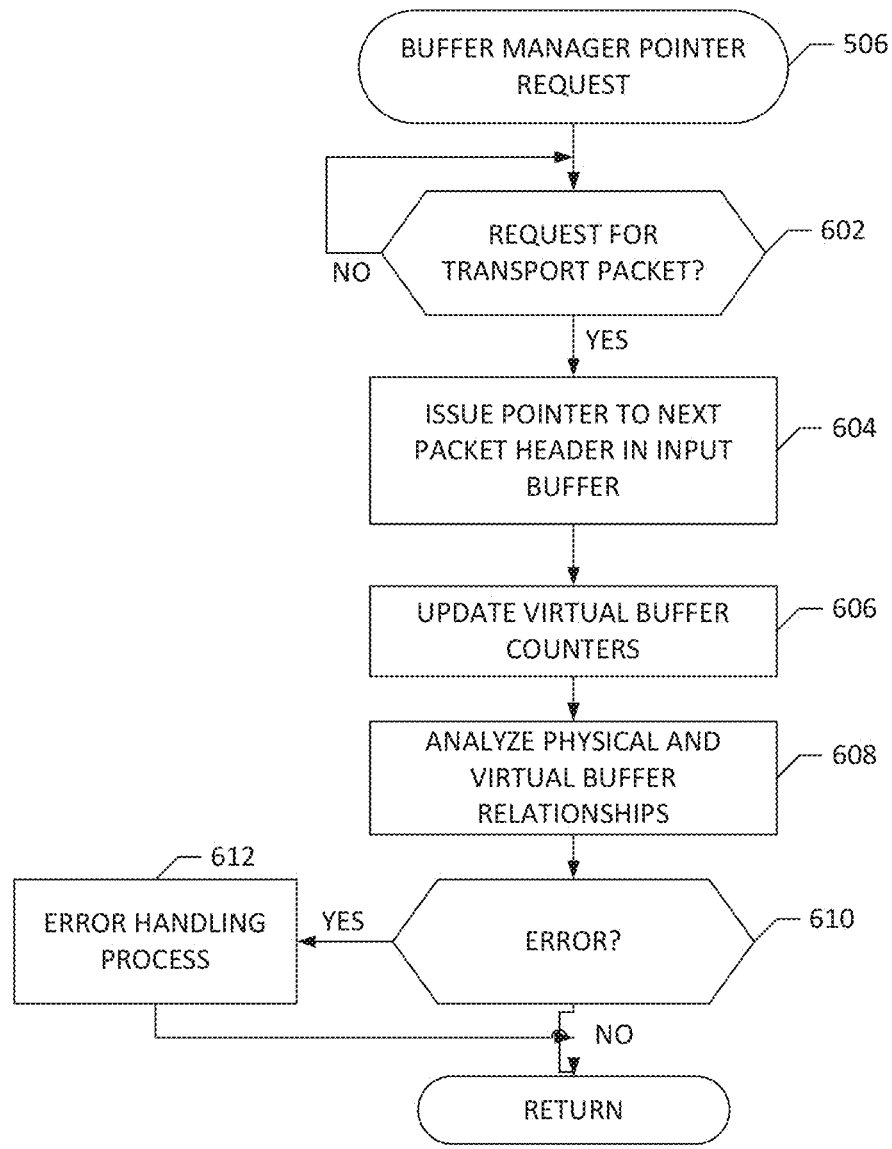
FIG. 6 is a detailed flow diagram depicting an example process that may be used to implement the buffer manager pointer request process of FIG. 5.
Figure 13:
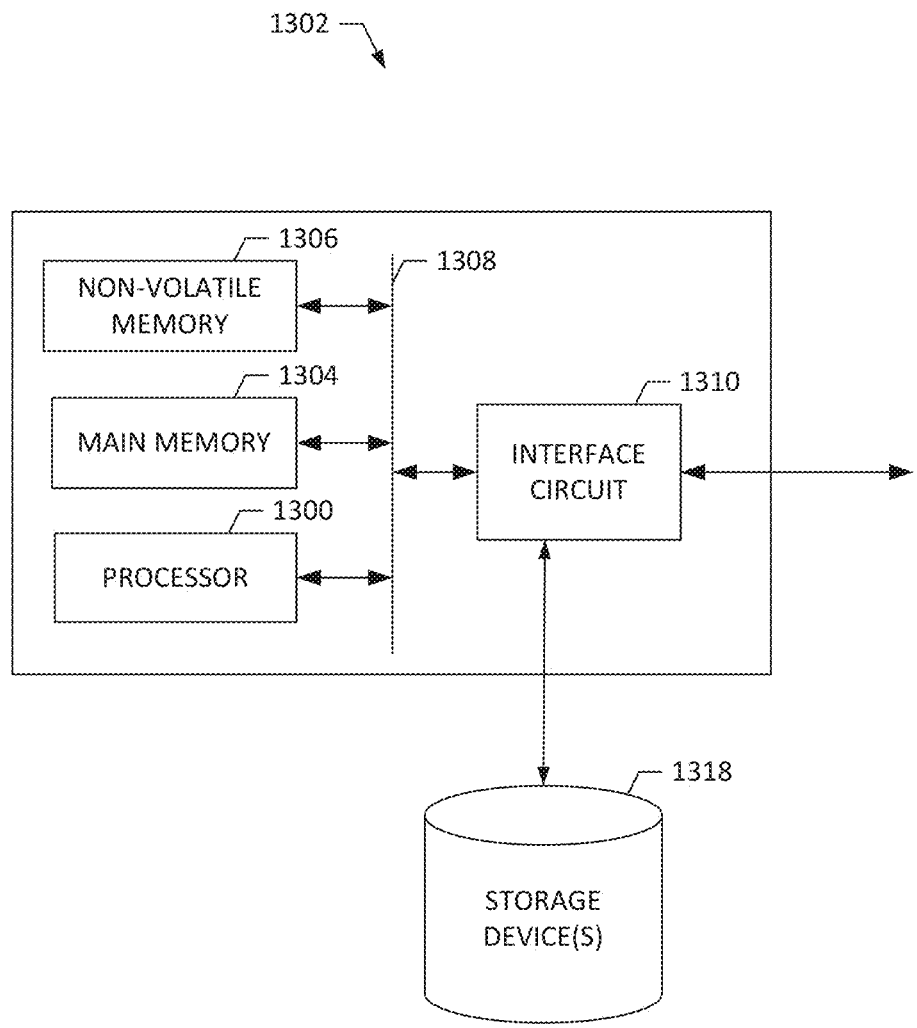
FIG. 13 is a block diagram of an example processor system that may be used to implement one or more of the functional blocks of the example encoder apparatus of FIG. 3 and/or one or more of the blocks of the example processes shown in FIGS. 4-11.

FIG. 6 is a flow diagram depicting a more detailed example of the buffer manager request process 506 (FIG. 5). As with the other processes described herein, the example process 600 may be implemented by the buffer manager block 304 (FIG. 3) and/or by the example processor system 1302 (FIG. 13). Regardless of the particular implementation, the example process 600 waits for a transport packet request (block 602) and, when such a request is received, the example process 600 issues a pointer to the next packet header in the input buffer 302 (FIG. 3) (block 604). After issuing the pointer at block 604, the example process 600 updates the counters associated with the virtual buffer 306 (FIG. 3) (block 606) and then analyzes the relationships between the input buffer 302 and the virtual buffer 306 (block 608). As described above in connection with FIG. 3, the results of these analyses may indicate a buffer overflow condition (i.e., an overflow of the input buffer 302), a buffer underflow condition, processing delays or other characteristics, etc.

The example process 600 may then determine whether one or more of the analyses results generated at block 608 are indicative of an error condition (e.g., a buffer overflow condition) (block 610). If such an error is identified at block 612, then an error handling process may be performed (block 612). Such an error handling process (block 612) may include providing notifications (e.g., visual alerts, audible alerts, etc.) to one or more users, system operators, technicians, etc. and/or may include automatic corrective action such as, for example, increasing the size of the input buffer 302 to eliminate an overflow condition. If no error is detected at block 610 or after performing the error handling process 612, control is returned to block 508 of FIG. 5.

Figure 7:
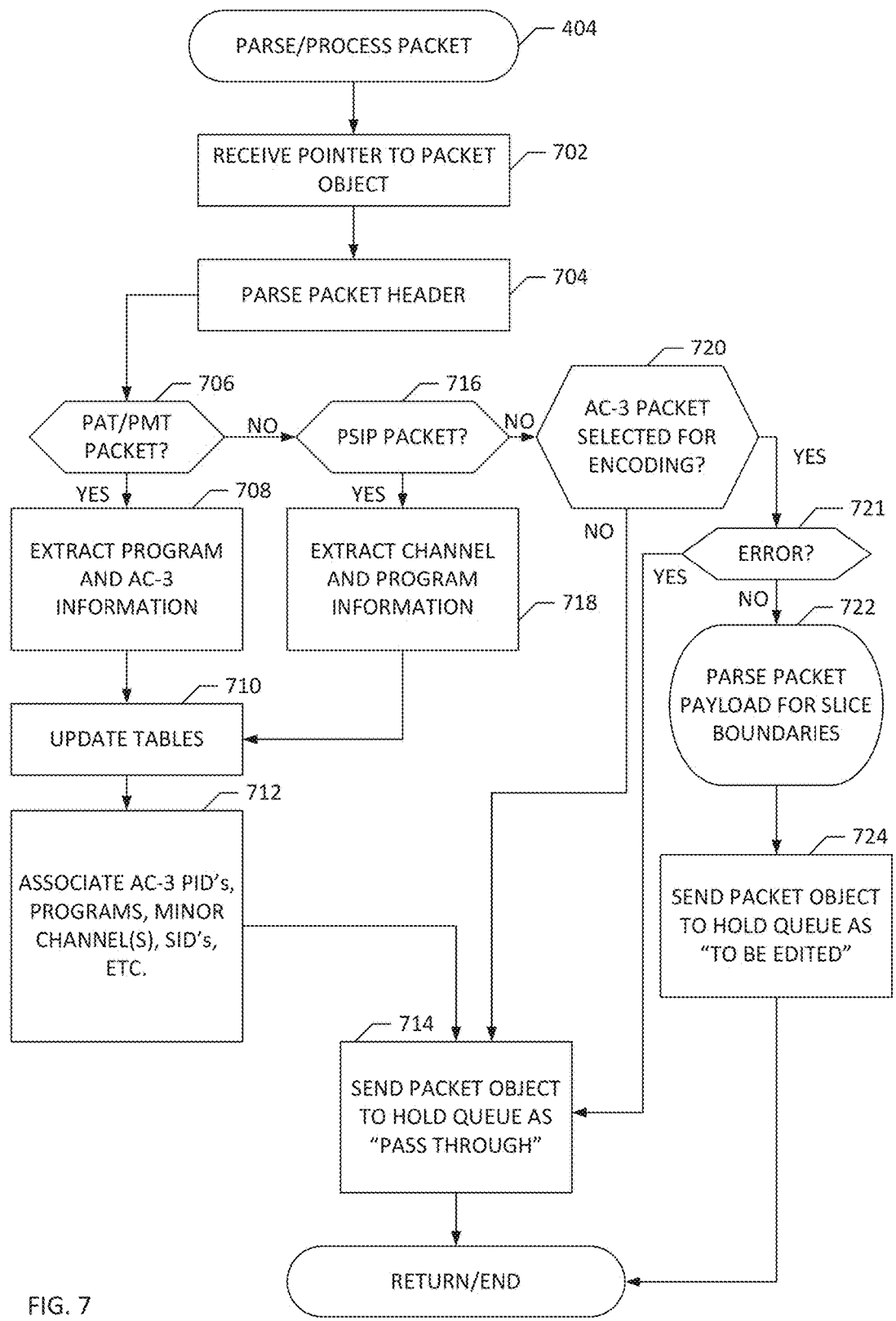
FIG. 7 is a detailed flow diagram depicting an example process that may be used to implement parse/process packet process of FIG. 4.

FIG. 7 is a flow diagram that depicts a more detailed example of the transport packet parsing/processing block 404 shown in FIG. 4. The various blocks or operations shown in the example of FIG. 7 may be performed by the transport parser 310 (FIG. 3) and/or the processor system 1302 (FIG. 13). Initially, the example process 404 receives a pointer to a packet object (e.g., via the example packet store process 500) (block 702). The packet object pointer is then used to locate and parse the header of the transport packet corresponding to the packet object (block 704). The transport packet and, thus, the header information are contained in the input buffer 302 (FIG. 3). Additionally, the header of the transport packet contains information reflecting the type of the transport packet. For example, the header may indicate that the packet payload contains video data, audio data, PMT information, PSIP information, PAT information, etc.

The example process 404 of FIG. 7 reads the packet header information to determine if the packet payload contains PAT or PMT information (block 706) and, if so, the process media program information and compressed audio stream information (e.g., AC-3 information) therefrom (block 708). In the case where the transport stream being processed is an MPEG-2 compliant data stream, a program identifier value of zero in the packet header indicates that the packet contains PAT information. As is known, PAT information includes a list of program number/PMT program identifier (PID) pairs, and PMT information provides a list of PID's for each of the component media streams within the transport stream being processed.

In general, the example process 404 uses the PAT and PMT information to build and maintain tables that are used by other portions of the process 404 to identify compressed audio packets within the transport stream being processed that are to be encoded. More specifically, at block 710, the example process 404 updates PMT's and PAT's as needed. For example, if the version information associated with the information extracted at block 708 indicates that versions have changed, the process 404 updates the PMT and PAT information. Following any needed updates at block 710, the example process 404 uses the PAT and PMT information to associate the PID's of compressed audio streams (e.g., AC-3 streams) with particular programs, associate programs with minor channel information, and minor channel information with SID's, SID's with programs, SID's with AC-3 PID's, etc. (block 712).

The processing of a packet containing PAT or PMT information concludes when the process 404 labels or marks the packet object associated with the PAT or PMT packet as a "pass-through" packet and sends the labeled or marked packet to the hold queue 314 (FIG. 3) (block 714). The marking or labeling of the packet objects at block 714 may be implemented by storing appropriate labeling information in the packet object.

If the process 404 determines that the packet being parsed/processed is not a PAT or PMT packet (block 706), the example process 404 determines if the packet being parsed/processed contains PSIP information (block 716). If the process 404 determines that the packet being parsed/processed contains PSIP information, channel and program information is extracted (block 718) and is used to update the tables at block 710. As is known, PSIP information relates a program number or identifier (PID) to each major/minor channel combination. Additionally, PSIP information may be used to generate a list of PID's for each of the elementary streams for each minor channel and, particularly, a list of PID's corresponding to the compressed audio associated with each program.

If the example process 404 determines at block 716 that the packet being parsed/processed does not contain PSIP information, the process 404 determines if the packet contains compressed audio (AC-3) information associated with a compressed audio stream selected for encoding (block 720). In particular, the tables updated at block 710 and the associations made at block 712 may be used to identify compressed audio packets to be encoded at block 720. If, at block 720, the packet being parsed/processed is identified as not having been selected for encoding, the packet object for that packet is marked as "pass-through" at block 714 and the process returns control to block 406 (FIG. 4). A more detailed description of one manner in which audio packets to be encoded can be identified at block 720 is provided in connection with FIG. 13 below.

On the other hand, if the packet being parsed/processed is identified as having been selected for encoding (block 720), the example process 404 may perform one or more error checking processes (block 721). In general, the error checking performed at block 721 may be used by the encoder 124 (FIG. 1) to ensure that the audio frames that it has selected for encoding are properly sized and/or aligned. For example, the transport parser 310 (FIG. 3) may examine header information associated with selected audio packets (e.g., AC-3 packets identified as to be encoded) to check the audio bit rate, frame size, cyclical redundancy check (CRC) information associated with the frame to be encoded, and/or the encoding mode. If any of these checks indicate that the audio frame is improperly aligned, improperly sized, and/or corrupted in any way an error has occurred and the packet object is sent to the hold queue as "pass through" (block 714). Additionally, in the case that an error is detected at block 721, the example process 404 (e.g., transport parser 310 (FIG. 3)) clears the frame buffer associated with the audio frame for which an error was detected and flushes the corresponding packet objects in the hold queue 314 (FIG. 3). Following the detection of an error at block 721, the encoder 124 (FIG. 1) searches for the beginning of the next audio frame and resumes encoding activities.

If no error is detected at block 721, the example process 404 parses the packet payload for slice boundaries (block 722). In general, the packet payload parsing process performed at block 722 stores slice boundary information within the packet object representing the packet being parsed/processed to associate one or more portions of a packet payload with one or more frames of compressed audio information. As described in greater detail in connection with FIG. 8, one packet payload may contain compressed audio information associated with only one frame of a compressed audio stream, while another packet payload may contain compressed audio information associated with two frames of a compressed audio stream. After the packet payload has been parsed at block 722, the example process 404 marks the packet object associated with that payload as "to be edited" (i.e., to be encoded) (block 724) and returns control to block 406 of FIG. 4. If during the example process 404, the example encoder 124 (FIG. 1) determines (e.g., by recognizing a change in PAT, PMT, and/or PSIP information) that the composition of the transport stream 122 (FIG. 1) has changed and/or that a significant interruption in the stream 122 has occurred, the example encoder 124 flushes all held packets, writes all previously parsed data to the output stream, resets all state machines, clears all internal data tables, and then resumes encoding activities.

Figure 8:
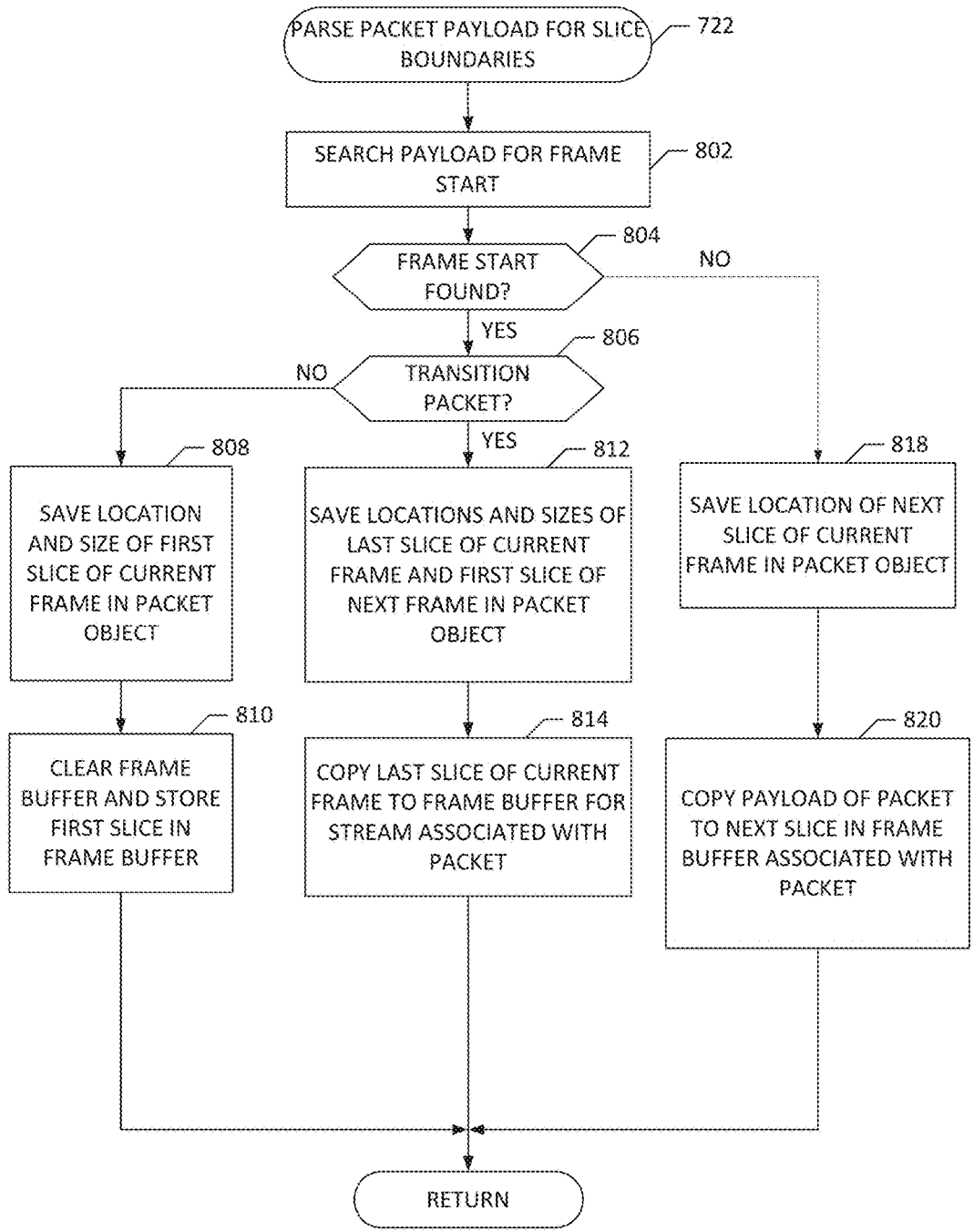
FIG. 8 is a detailed flow diagram depicting an example process that may be used to implement the parse packet payload for slice boundaries process of FIG. 7.

FIG. 8 is a more detailed flow diagram of the example payload parsing process 722 of FIG. 7. Initially, the example payload parsing process 722 searches the packet payload for a frame start (block 802). In particular, the example process 722 looks for a particular data value or data sequence (e.g., in the case of an AC-3 compliant audio stream the sequence 0xb77 indicates the start of a frame).

If a frame start data value or sequence is found at block 804, the example process 722 determines if the packet being parsed is a transition packet (i.e., is a packet containing data for multiple frames of a media stream) (block 806). If, at block 806, the example process 722 determines that the frame start sequence is associated with the first frame of a compressed audio stream to be encoded, then the packet to be parsed is not a transition packet and the example process 722 saves the location and size (e.g., number of bytes) of the first slice in the packet object associated with the packet being parsed (block 808). The example process 722 then clears the frame buffer assigned to hold frame data for the audio stream associated with the slice of the packet being parsed/processed. As noted above, each frame buffer is uniquely assigned to hold data from a corresponding audio stream.

If, on the other hand, the example process 722 determines that the packet being parsed/processed at block 806 is a transition packet (i.e., a packet containing slice data from two frames of a compressed audio stream), the example process 722 saves or stores the locations and sizes of the last slice of a current frame and the first slice of a next frame in the packet object associated with the packet currently being parsed/processed (block 812). The example process 722 then copies the last slice of the current frame to the frame buffer for the stream associated with the packet being parsed (block 814).

If a frame start is not found at block 804, then the example process 722 saves the location of the next slice of the current frame in the packet object representative of the packet containing the slice. In this case, the packet being parsed/processed is a continuation packet (i.e., contains a payload associated only with the current frame). Thus, the example process 722 copies the payload of the packet to the next slice in the frame buffer associated with the packet (and, thus, the audio stream) being parsed/processed (block 820).

Figure 9:
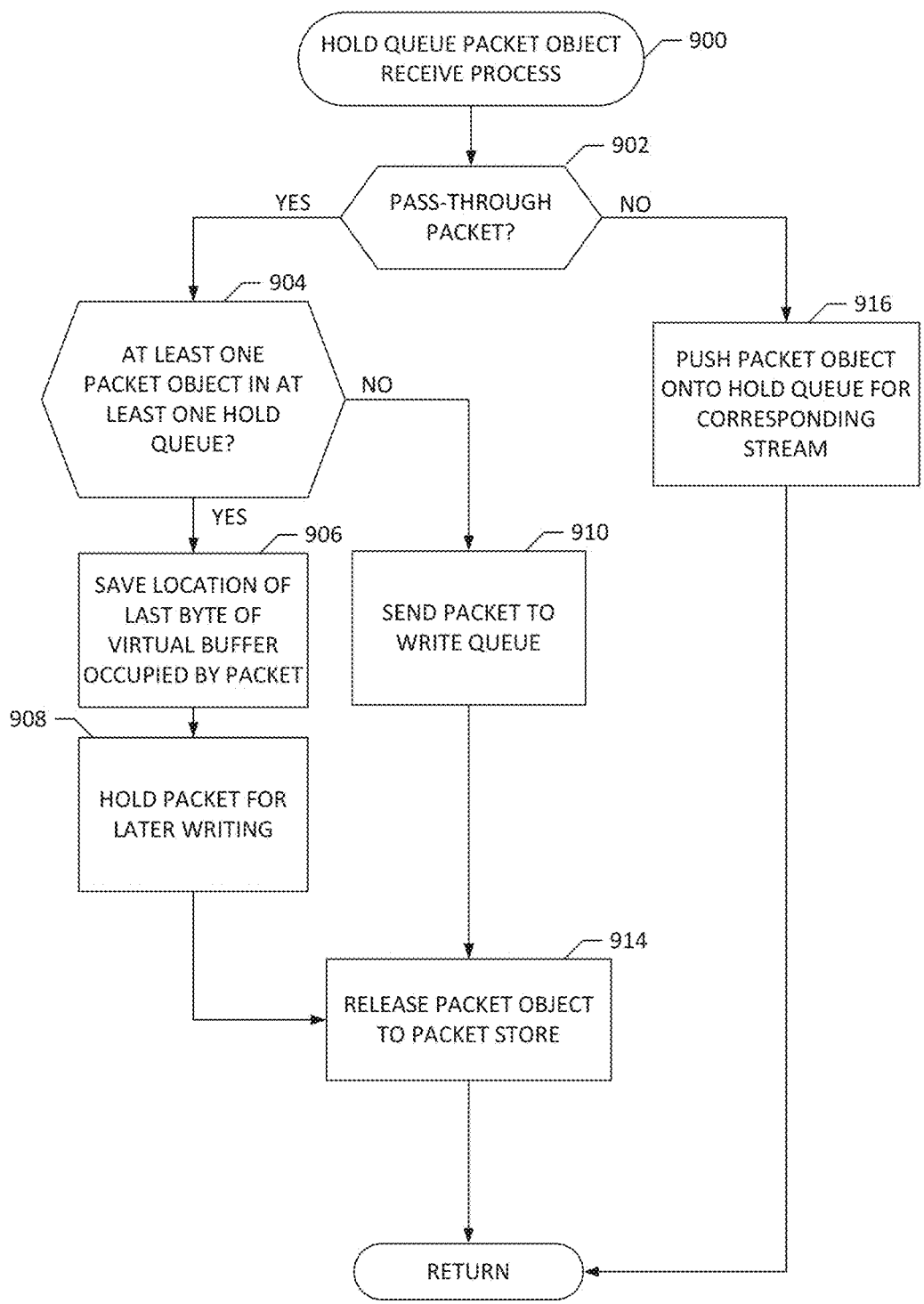
FIG. 9 is a detailed flow diagram depicting an example process that may be used by the hold queue of FIG. 3 to receive packet objects from the example parse/process packet process of FIG. 7.

FIG. 9 is a flow diagram of an example process 900 by which the hold queue 314 (FIG. 3) receives packet objects from the transport parser 310 (FIG. 3). More specifically, as shown in FIG. 7, the example packet parsing/processing process 404 sends packet objects to the hold queue as either "pass-through" packets (block 714) or as "to be edited" packets (block 724). Turning in detail to FIG. 9, the example hold queue process 900 determines whether the received packet object represents a pass-through packet (block 902). If the packet object is representative of a pass-through packet (i.e., a packet that is not to be encoded), the example process 900 determines whether there is currently at least one packet object in at least one of the hold queues, each of which corresponds to an audio stream to be encoded (block 904). If there is at least one packet object in at least one of the hold queues at block 904, the example process 900 saves the location of the last byte of the virtual buffer 306 occupied by the packet (block 906), indicates that the packet is to be held for later writing or transmission (block 908), and releases the packet object representing that packet to the packet store 312 (FIG. 3) for reuse (block 914). On the other hand, if at block 904 the process 900 determines that there are currently no packet objects in any of the hold queues, the process sends the packet to the packet write queue 318 (block 910), and releases the packet object representing the packet currently being processed to the packet store 312 (block 914). If the example process 900 determines at block 902 that the packet to be processed is not a "pass-through" packet (i.e., the packet is a "to be edited" packet), the example process 900 pushes the packet object onto a hold queue corresponding to the audio stream associated with the packet represented by the packet object (block 916).

Figure 10:
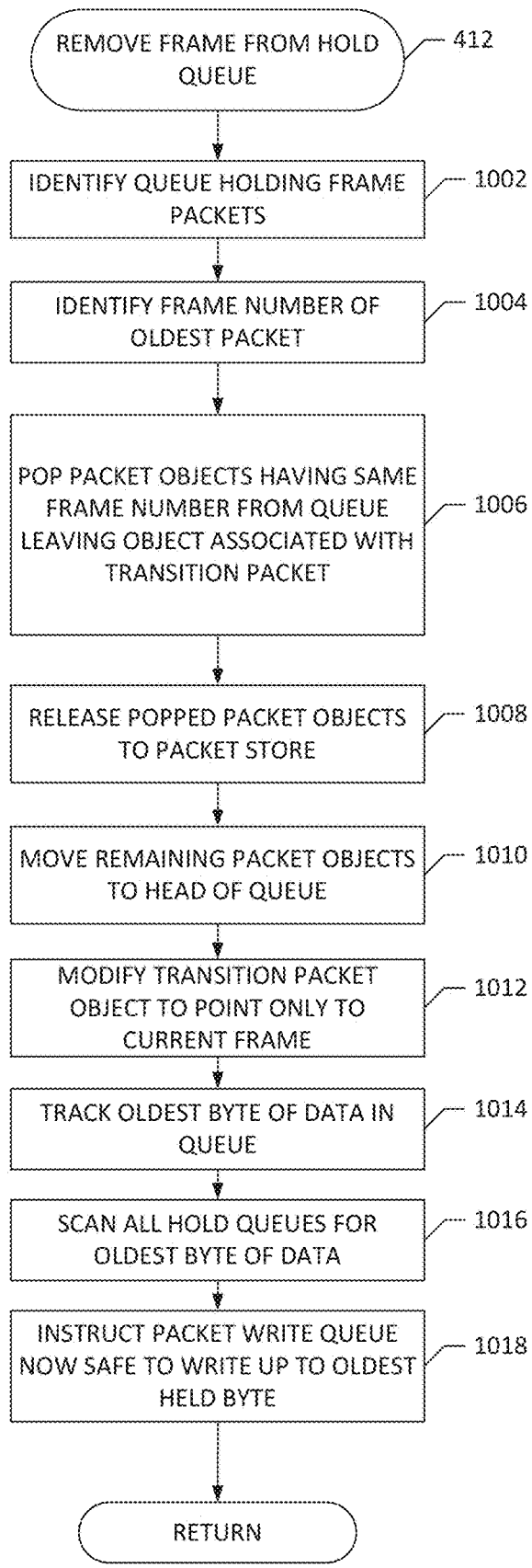
FIG. 10 is a detailed flow diagram depicting an example process that may be used to implement the remove frame from hold queue process of FIG. 4.

FIG. 10 is a detailed flow diagram of the example hold queue frame removal process 412 (FIG. 4). The example frame removal process 412 initially identifies the hold queue holding the packet objects associated with the frame to be removed (block 1002). After identifying the queue at block 1002, the example frame removal process 412 identifies the frame number of the oldest packet object (block 1004) and then pops (i.e., removes) packet objects having the same frame number from the queue, leaving any object associated with a transition packet (i.e., a packet which also contains data associated with a subsequent frame) (block 1006). The packet objects popped or removed at block 1006 are then released to the packet store 312 (FIG. 3) for reuse (i.e., are recycled for use) by the packet store 312 (block 1008). Any packet objects remaining on the queue from which packets have been popped at block 1006 are then moved to the head of their respective queue (block 1010) and the remaining transition packet object (i.e., a packet object representing a transport packet containing slices from two frames) is modified to contain pointer information (i.e., to point to) only the current frame (block 1012).

The example process 412 tracks (e.g., stores or otherwise preserves) the location of the oldest byte of data in the queue from which the frame was removed (block 1014). Then, the example process 412 scans all of the hold queues for the overall oldest byte of data (block 1016) and instructs the packet write queue 318 that it is now safe to write up to the oldest held byte from the input buffer 302 (block 1018).

Figure 11:
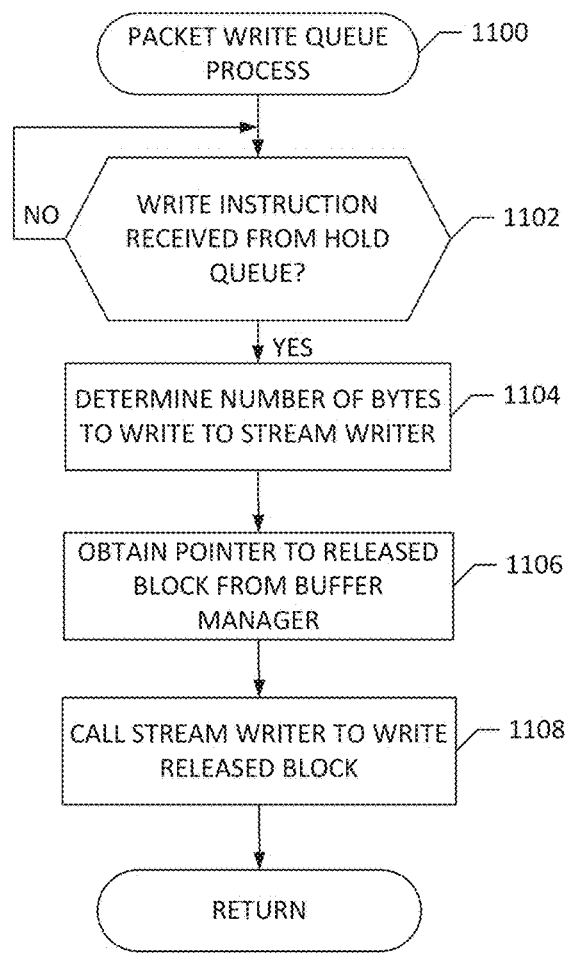
FIG. 11 is a detailed flow diagram depicting an example process that may be used to implement the transmit packet(s) block of FIG. 4.

FIG. 11 is a flow diagram of an example process 1100 that may be used by the packet write queue 318 (FIG. 3) to perform the transmit packet(s) process 416 (FIG. 4). The example process 1100 determines whether a write instruction has been received from the hold queue 314 (FIG. 3) and/or the block 1018 of FIG. 10 (block 1102). If the example process 1100 determines that a write instruction has been received at block 1102, then the example process 1100 determines the number of bytes to write to the stream writer 320 (FIG. 3) (block 1104). The example process 1100 may determine the number of bytes to be written at block 1104 by subtracting the number of bytes already written (i.e., the cumulative number of bytes written) from the virtual buffer location of the oldest held byte to which the process 1100 has been instructed to write up to by block 1018 (FIG. 10) performed by the hold queue 314. For example, if the example process 1100 has determined that 1880 bytes (or ten MPEG-2 packets) have been written and the write instruction received from the hold queue process of FIG. 10 indicates that it is now safe to write up to byte 2256 of the virtual buffer 306 (FIG. 3), then the example write queue process 1100 determines at block 1104 that the next 376 bytes of the input buffer 302 are to be written to the stream writer 320 (i.e., transmitted).

The example process 1100 then obtains a pointer to the released block of bytes from the buffer manager 304 (FIG. 3) (block 1106). The example process 1100 then uses the pointer information obtained at block 1106 to call the stream writer 320 to write the next block of data from the input buffer 302 (FIG. 3).

Figure 12:
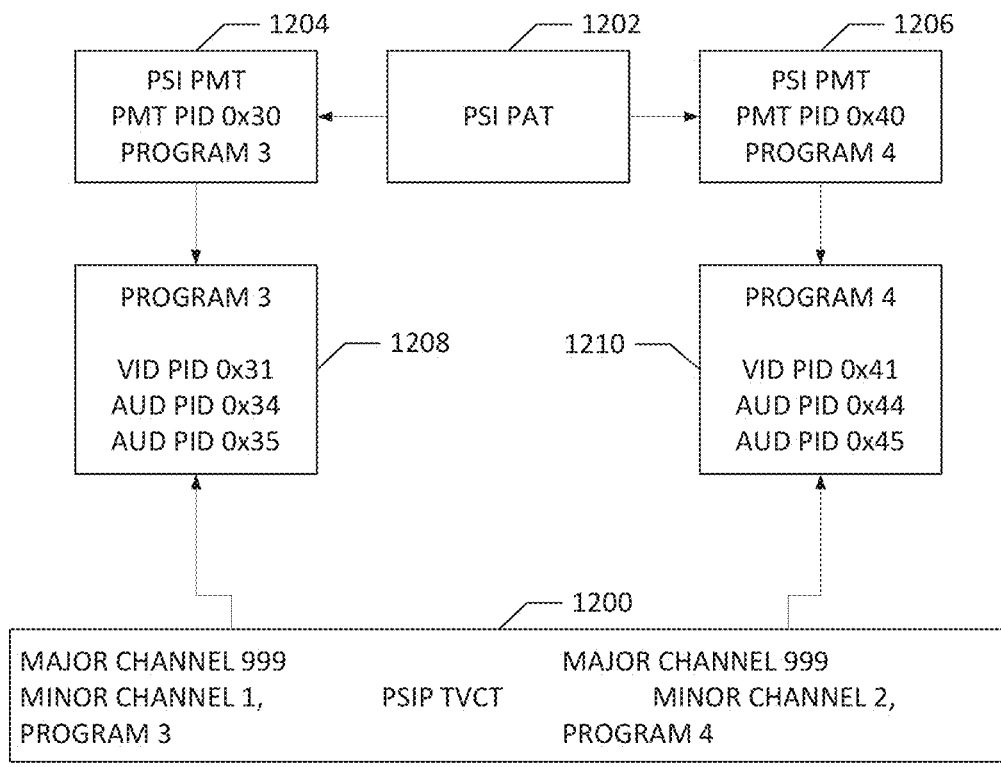
FIG. 12 is block diagram depicting an example of the relationships between programs in a transport stream, elementary streams composing the programs, and major/minor channel pairs.

FIG. 12 is a block diagram depicting an example manner in which transport stream programs, elementary streams composing those transport stream programs, and major/minor channel pairs are related. As described in greater detail below, the relationships depicted in FIG. 12 may be used to filter, select, or otherwise identify AC-3 packets to be encoded (e.g., at block 720 of FIG. 7). In the example of FIG. 12, the relationships depicted are typical of those used in connection with an MPEG-2 transport stream.

Now turning in detail to FIG. 12, a PSIP terrestrial virtual channel table (TVCT) 1200, which is defined in the PSIP of the ATSC standard, relates major/minor channel pairs to particular programs. In the example TVCT 1200, for instance, program 3 corresponds to major channel 999 and minor channel 1 (i.e., channel 999/1), and program 4 corresponds to major channel 999 and minor channel 2 (i.e., channel 999/2). More generally, the TVCT 1200 associates a major/minor channel pair with each program (e.g., MPEG-2 program) present in the transport stream (e.g., the transport stream 122 of FIG. 1). Additionally, the TVCT 1200 may also list the elementary streams, each of which may be identified by a transport PID, composing each of the programs within the transport stream. However, under prevailing standards (e.g., the ATSC standard A/65B of Mar. 18, 2003), the example TVCT 1200 is only optionally included in an MPEG-2 transport stream.

In the example of FIG. 12, a program association table (PAT) 1202 provides respective PID's identifying respective program map tables (PMT's) 1204 and 1206 for programs 3 and 4. Each of the PMT's 1204 and 1206 identifies respective groups of elemental streams 1208 and 1210 composing respective programs 3 and 4. In the example of FIG. 12, program 3 is composed of a video stream having PID 0x31, and two audio streams having PID's 0x34 and 0x35. Similarly, program 4 is composed of a video stream having PID 0x41 and two audio streams having PID's 0x44 and 0x45.

Having provided some example relationships between program numbers (e.g., MPEG-2 program numbers), major/minor channel pairs, and elementary streams (e.g., using PID's) composing the programs, a manner of using these relationships to filter, select, or otherwise identify AC-3 packets to be encoded (e.g., at block 720 of FIG. 7) is now described.

In one example, a four-part key including a major channel number, a minor channel number, a program number, and an elementary stream PID is used to identify elementary streams to be encoded. One or more such keys may be provided to the example encoding apparatus 124 (FIG. 1) during configuration. Each such key corresponds to one of a plurality of available encoding methods. In general, each of the available encoding methods may specify the nature of the data to be inserted into the elementary stream corresponding to the key. Additionally, in this example, only non-zero key portions are considered as criteria for filtering. Finally, in the case that conflicting keys are provided, the encoding method associated with the first submitted key is applied to its corresponding elementary stream.

Table 1 below provides an nine example keys that may be applied to a transport stream having, for example, the relationships between elementary stream PID's, major/minor channel pairs, and MPEG-2 PAT's and PMT's for programs 3 and 4 shown in FIG. 12. However, it should be recognized that additional or alternative keys may be used instead of the group of keys shown in TABLE 1.

submitted, the encoder 124 (FIG. 1) applies the first provided key. Thus, if the example keys in TABLE 1 were provided to the encoder 124 in the order listed, the first key 999/0/0/0 would be applied and the remaining eight keys would be ignored. As described above in connection with FIG. 7, each time the example encoder 124 (FIG. 1) parses a complete PAT, PMT, or TVCT, the example encoder 124 updates its internal tables at block 710 (FIG. 7) to reflect changes in, for example, major/minor channel numbers, program numbers, and/or audio stream PID's.

FIG. 13 depicts an example processor system 1302 that may be used to implement, for example, one or more of the functional blocks shown in the example encoder 124 of FIG. 3 and/or to execute machine readable instructions or code represented by the various blocks of the flow diagrams of FIGS. 4-11. The example processor-based system 1302 may be, for example, a server, a personal computer, or any other type of computing device.

TABLE 1

| Major Channel | Minor Channel | Program Number | Audio PID | Encoding Method | Instructions | Result (Audio Streams Encoded) |
|---|---|---|---|---|---|---|
| 999 | 0 | 0 | 0 | A | Using Method A, encode all audio streams associated with channel 999. | 0x34, 0x35, 0x44, 0x45 |
| 999 | 1 | 0 | 0 | B | Using Method B, encode all audio streams associated with channel 999/1. | 0x34, 0x35 |
| 999 | 2 | 0 | 0 | C | Using Method C, encode all audio streams associated with channel 999/2. | 0x44, 0x45 |
| 0 | 0 | 3 | 0 | D | Using Method D, encode all audio streams associated with Program Number 3. | 0x34, 0x35 |
| 0 | 0 | 4 | 0 | E | Using Method E, encode all audio streams associated with Program Number 4. | 0x44, 0x45 |
| 0 | 0 | 0 | 0x34 | F | Using Method F, encode only audio stream 0x34. | 0x34 |
| 0 | 0 | 0 | 0x35 | G | Using Method G, encode only audio stream 0x35. | 0x35 |
| 0 | 0 | 0 | 0x44 | H | Using Method H, encode only audio stream 0x44. | 0x44 |
| 0 | 0 | 0 | 0x45 | I | Using Method I, encode only audio stream 0x45. | 0x45 |

With reference to TABLE 1 above, if the first key 999/0/0/0 is provided to the encoder 124 (FIG. 1), at block 720 (FIG. 7) the example encoder 124 (FIG. 1) uses encoding method A to encode all audio streams associated with channel 999. In particular, as shown in TABLE 1, elementary audio streams having PID's 0x34, 0x35, 0x44, and 0x45 are selected for encoding at block 720 (FIG. 7). Again, as noted above, the zero-valued portions of the key (i.e., the minor channel, program number, and audio PID) are ignored and, thus, all streams associated with major channel 999 are encoded. Also, as noted above, if conflicting keys are The processor 1300 may, for example, be implemented using one or more Intel® microprocessors from the Pentium® family, the Itanium® family or the XScale® family. Of course, other processors from other families are also appropriate. The processor 1300 is in communication with a main memory including a volatile memory 1304 and a non-volatile memory 1306 via a bus 1308. The volatile memory 1304 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1306 may be implemented by flash memory and/or any other desired type of memory device. Access to the memory 1304 is typically controlled by a memory controller (not shown) in a conventional manner.

The system 1302 also includes an interface circuit 1310. The interface circuit 1310 may be implemented by any type of well-known interface standard to, for example, enable the system 1302 to communicate with the transmitter 126 (FIG. 1) and/or via the communication link 150 (FIG. 1).

The system 1302 also includes one or more mass storage devices 1318 for storing software and/or data. Examples of such mass storage devices include floppy disk drives, hard drive disks, compact disk drives and digital versatile disk (DVD) drives.

Although certain methods, apparatus and articles of manufacture have been described herein, the scope of coverage of this patent is not limited thereto. To the contrary, this patent covers all method, apparatus and articles of manufacture fairly falling within the scope of the appended claims either literally or under the doctrine of equivalents.

What is claimed is:

1. A method of watermarking a digital media signal, the method comprising:
    copying compressed audio packets associated with an audio stream included in a transport stream of the digital media signal into respective frames of compressed audio data to be watermarked to include media identification information;
    determining, by executing an instructions with a processor, whether a composition of the transport stream has changed during copying of the compressed audio packets into the respective frames of the compressed audio data;
    if the composition of the transport stream has changed, flushing packets that have been held for watermark processing and writing the frames of the compressed audio data to an output stream corresponding to the digital media signal without applying a watermark to the frames of the compressed audio data;
    resetting, by executing an instruction with the processor, a watermarking state machine being executed by the processor and clearing an associated data table if the composition of the transport stream has changed; and
    if the composition of the transport stream has not changed, writing the frames of the compressed audio data to the output stream corresponding to the digital media signal after applying the watermark to the frames of the compressed audio data.

2. The method as defined in claim 1, wherein the determining of whether the composition of the transport stream has changed is based on detecting whether at least one of program association table (PAT) information, program map table (PMT) information or program and system information protocol (PSIP) information associated with the transport stream has changed.

3. The method as defined in claim 1, further including:
    identifying a complete one of the respective frames;
    determining whether the complete frame is in error; and
    if the complete frame is in error, discarding the complete frame without watermarking the complete frame.

4. The method as defined in claim 3, further including, if the complete frame is in error, writing the compressed audio packets associated with the complete frame to the output stream corresponding to the digital media signal without watermarking the compressed audio packets associated with the complete frame.

5. The method as defined in claim 3, wherein the determining of whether the complete frame is in error includes at least one of:
    determining whether the complete frame is improperly aligned;
    determining whether the complete frame is improperly sized; or
    determining whether the complete frame is corrupted.

6. A tangible machine readable storage device or storage disk comprising machine readable instructions which, when executed, cause a processor to at least:
    copy compressed audio packets associated with an audio stream included in a transport stream of a digital media signal into respective frames of compressed audio data to be watermarked to include media identification information;
    determine whether a composition of the transport stream has changed during copying of the compressed audio packets into the respective frames of the compressed audio data;
    if the composition of the transport stream has changed, flush packets that have been held for watermark processing and write the frames of the compressed audio data to an output stream corresponding to the digital media signal without applying a watermark to the frames of the compressed audio data;
    reset a watermarking state machine executed by the processor and clear an associated data table if the composition of the transport stream has changed; and
    if the composition of the transport stream has not changed, write the frames of the compressed audio data to the output stream corresponding to the digital media signal after the watermark has been applied to the frames of the compressed audio data.

7. The storage device or storage disk as defined in claim 6, wherein the machine readable instructions, when executed, cause the processor to determine whether the composition of the transport stream has changed based on detecting whether at least one of program association table (PAT) information, program map table (PMT) information or program and system information protocol (PSIP) information associated with the transport stream has changed.

8. The storage device or storage disk as defined in claim 6, wherein the machine readable instructions, when executed, cause the processor to:
    identify a complete one of the respective frames;
    determine whether the complete frame is in error; and
    if the complete frame is in error, discard the complete frame without watermarking the complete frame.

9. The storage device or storage disk as defined in claim 8, wherein, if the complete frame is in error, the machine readable instructions, when executed, cause the processor to write the compressed audio packets associated with the complete frame to the output stream corresponding to the digital media signal without watermarking the compressed audio packets associated with the complete frame.

10. The storage device or storage disk as defined in claim 8, wherein the machine readable instructions, when executed, cause the processor to determine whether the complete frame is in error by at least one of:
    determining whether the complete frame is improperly aligned;
    determining whether the complete frame is improperly sized; or
    determining whether the complete frame is corrupted.

11. An apparatus to watermark a digital media signal, the apparatus comprising:

an encoder to:

copy compressed audio packets associated with an audio stream included in a transport stream of the digital media signal into respective frames of compressed audio data to be watermarked to include media identification information;

determine whether a composition of the transport stream has changed during copying of the compressed audio packets into the respective frames of the compressed audio data;

if the composition of the transport stream has changed, flush packets that have been held for watermark processing and write the frames of the compressed audio data to an output stream corresponding to the digital media signal without applying a watermark to the frames of the compressed audio data;

reset a watermarking state machine executed by the encoder and clear an associated data table if the composition of the transport stream has changed; and if the composition of the transport stream has not changed, write the frames of the compressed audio data to the output stream corresponding to the digital media signal after the watermark has been applied to the frames of the compressed audio data; and memory to store the frames of the compressed audio data.

12. The apparatus as defined in claim 11, wherein the encoder is to determine whether the composition of the transport stream has changed based on detecting whether at least one of program association table (PAT) information, program map table (PMT) information or program and system information protocol (PSIP) information associated with the transport stream has changed.

13. The apparatus as defined in claim 11, wherein the encoder is further to:

identify a complete one of the respective frames;

determine whether the complete frame is in error; and if the complete frame is in error, discard the complete frame without watermarking the complete frame.

14. The apparatus as defined in claim 13, wherein, if the complete frame is in error, the encoder is further to write the compressed audio packets associated with the complete frame to the output stream corresponding to the digital media signal without watermarking the compressed audio packets associated with the complete frame.

15. The apparatus as defined in claim 13, wherein to determine whether the complete frame is in error, the encoder is to at least one of:

determine whether the complete frame is improperly aligned;

determine whether the complete frame is improperly sized; or determine whether the complete frame is corrupted.

* * * * *